(12) United States Patent
Chen et al.

(10) Patent No.: US 10,687,316 B2
(45) Date of Patent: Jun. 16, 2020

(54) TECHNIQUES FOR ENABLING COMPONENT CARRIERS FOR MULTI-CARRIER WIRELESS COMMUNICATION

(71) Applicant: QUALCOMM Incorporated, San Diego, CA (US)

(72) Inventors: Wanshi Chen, San Diego, CA (US); Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/799,870

(22) Filed: Jul. 15, 2015

(65) Prior Publication Data
US 2015/0319753 A1 Nov. 5, 2015

Related U.S. Application Data

(60) Provisional application No. 62/025,898, filed on Jul. 17, 2014.

(51) Int. Cl.
*H04W 72/04* (2009.01)
*H04L 5/00* (2006.01)
(Continued)

(52) U.S. Cl.
CPC ...... *H04W 72/0413* (2013.01); *H04B 17/309* (2015.01); *H04L 1/1812* (2013.01);
(Continued)

(58) Field of Classification Search
CPC .......... H04W 72/0413; H04W 72/0453; H04B 17/309; H04L 1/1812; H04L 5/001; H04L 5/0053; H04L 5/14
See application file for complete search history.

(56) References Cited

U.S. PATENT DOCUMENTS 9,130,698 B2   9/2015 Khandekar et al.
9,681,326 B2 * 6/2017 He .................... H04W 4/70
(Continued)

FOREIGN PATENT DOCUMENTS

CN     101588224 A   11/2009
EP       2699036 A2    2/2014
(Continued)

OTHER PUBLICATIONS

RP-141417 #GPP TSG RAN Meeting #65 LTE Carrier Aggregation Enhancement Beyond 5 Carriers Sep. 9-12, 2014.*
(Continued)

*Primary Examiner* — Jeffrey M Rutkowski
*Assistant Examiner* — Basil Ma
(74) *Attorney, Agent, or Firm* — Holland & Hart LLP/QUALCOMM Incorporated

(57) ABSTRACT

The present disclosure relates to one or more techniques for enabling component carriers for multi-carrier wireless communication. A capability of a UE or base station to support more than five downlink component carriers may be identified and indicated. A multi-carrier configuration, which may include more than five component carriers may be received. The multi-carrier configuration may include a first group of component carriers and a second group of component carriers. A first physical uplink control channel (PUCCH), a second PUCCH, or a combination of the first PUCCH and the second PUCCH, may be transmitted. The first PUCCH may be associated with the plurality of downlink component carriers of the first group, and the second PUCCH may be associated with the at least one downlink component carrier of the second group.

26 Claims, 16 Drawing Sheets

(51) Int. Cl.
*H04B 17/309* (2015.01)
*H04L 1/18* (2006.01)
*H04L 5/14* (2006.01)

(52) U.S. Cl.
CPC ............ *H04L 5/001* (2013.01); *H04L 5/0053* (2013.01); *H04L 5/14* (2013.01); *H04W 72/0453* (2013.01); *H04L 5/0055* (2013.01); *H04L 5/0057* (2013.01); *Y10T 436/143333* (2015.01)

(56) References Cited

U.S. PATENT DOCUMENTS

| | | | |
|---|---|---|---|
| 2010/0271970 A1* | 10/2010 | Pan | H04L 1/0026 370/252 |
| 2011/0286391 A1 | 11/2011 | Chen et al. | |
| 2011/0310986 A1 | 12/2011 | Heo et al. | |
| 2012/0134333 A1 | 5/2012 | Nakao et al. | |
| 2012/0155337 A1* | 6/2012 | Park | H04L 1/1692 370/280 |
| 2012/0300641 A1* | 11/2012 | Chen | H04L 1/0026 370/241 |
| 2012/0320805 A1* | 12/2012 | Yang | H04L 1/18 370/280 |
| 2013/0039202 A1* | 2/2013 | Feuersanger | H04L 5/001 370/252 |
| 2013/0114474 A1* | 5/2013 | Fu | H04L 5/0055 370/280 |
| 2013/0272157 A1* | 10/2013 | Gao | H04W 52/146 370/252 |
| 2014/0286292 A1* | 9/2014 | Park | H04L 5/0053 370/329 |
| 2014/0335882 A1* | 11/2014 | Lee | H04W 76/025 455/452.2 |

FOREIGN PATENT DOCUMENTS

| | | |
|---|---|---|
| JP | 2011182104 A | 9/2011 |
| JP | 2013533675 A | 8/2013 |
| JP | 2014502088 A | 1/2014 |
| JP | 2014090396 A | 5/2014 |
| WO | WO-2010135706 A2 | 11/2010 |
| WO | WO-2013043025 A2 | 3/2013 |

OTHER PUBLICATIONS

China Unicom, "Considerations on PUCCH Format Enhancements for LTE CA Up to 32 CCs," R1-151789, 3GPP TSG RAN WG1 Meeting #80bis, Belgrade, Serbia, Apr. 20-24, 2015, 2 pgs., 3rd Generation Partnership Project.

ISA/EPO, International Search Report and Written Opinion of the International Searching Authority, Int'l Appl. No. PCT/US2015/040705, Sep. 24, 2015, European Patent Office, Rijswijk, NL, 11 pgs.

LGE Electronics Inc., "PUCCH Configuration and Transmission Modeling in CA Enhancement," R2-150379, 3GPP TSG-RAN WG2 Meeting #89, Athens, Greece, Feb. 9-13, 2015, 2 pgs., 3rd Generation Partnership Project.

LG Electronics: "Remaining RAN1 issues of Dual Connectivity", 3GPP Draft; 3GPP TSG RAN WG1 Meeting #77, R1-142143 DC Details Final, 3rd Generation Partnership Projet (3GPP), Mobile Competence Centre, 650, Route Des Lucioles, F-06921, Sophia-Antipolis Cedex, France, vol. RAN WG1, No. Seoul, Korea, May 19, 2014-May 23, 2014, May 10, 2014 (May 10, 2014), XP050814640, 6 Pages, Retrieved from the Internet: URL: http://www.3gpp.org/ftp/tsg_ran/WG1_RL1/TSGR1_77/Docs//R1-142143.zip, [retrieved on May 10, 2014] Sections 2.2, 2.3.

Samsung: "Resources for HARQ-ACK and RI Multiplexing in PUSCH", 3GPP TSG RAN WG1 #63bis, R1-110076, Jan. 31, 2011, pp. 1-3, Retrieved from the Internet: URL: http://www.3gpp.org/ftp/tsg_ran/WG1_RL1/TSGR1_63b/Docs/R1-110076.zip, [retrieved on Mar. 27, 2019].

\* cited by examiner

TECHNIQUES FOR ENABLING COMPONENT CARRIERS FOR MULTI-CARRIER WIRELESS COMMUNICATION

CROSS REFERENCES

The present Application for Patent claims priority to U.S. Provisional Patent Application No. 62/025,898 by Chen et al., entitled "Techniques for Enabling Component Carriers for Multi-Carrier Wireless Communication," filed Jul. 17, 2014, assigned to the assignee hereof, and expressly incorporated by reference herein.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell. In some cases the coverage area may be subdivided into multiple cells. Also, in some cases, a base station may transmit multiple component carriers on different portions of available spectrum. These component carriers may also be referred to as cells.

A user equipment (UE) may be served by more than one carrier. In some cases a UE may be served by multiple carriers transmitted from a single base station (e.g., in a carrier aggregation mode); in other cases, a UE may be served by multiple carriers transmitted from more than one base station (e.g., a dual connectivity mode). The number of carriers that may serve the UE may be limited by the available bandwidth spectrum and the capabilities of the control channel signaling, such as a physical uplink control channel (PUCCH).

SUMMARY

The described features generally relate to improved systems, methods, and apparatuses for enabling component carriers for multi-carrier wireless communication. The component carriers may be in multiple groups, and a physical uplink control channel (PUCCH) may be associated with each group. The two PUCCHs may configure more than five downlink component carriers for multi-carrier wireless communication.

In a first set of illustrative examples, a method for wireless communication is described. In one example, the method may include indicating a capability of supporting more than five downlink component carriers or of supporting a dual physical uplink control channel (PUCCH) configuration; receiving a multi-carrier configuration of more than five downlink component carriers comprising a first group of downlink component carriers and a second group of downlink component carriers; and transmitting at least one of a first PUCCH or a second PUCCH, the first PUCCH being associated with a downlink component carrier of the first group, and the second PUCCH being associated with a downlink component carrier of the second group.

In some examples of the method, the plurality of downlink component carriers of the first group and the at least one downlink component carrier of the second group comprise a total of more than five downlink component carriers. In some examples, the first group of component carriers are different from the second group of component carriers. In some examples, the method includes determining a first hybrid automatic repeat request (HARQ) payload size for the first PUCCH and a second HARQ payload size for the second PUCCH, wherein a total HARQ payload size of the first HARQ payload size and the second HARQ payload size exceeds a threshold. In some examples of the method, the threshold is 20 bits.

In some examples of the method, the first PUCCH and the second PUCCH are configured on a common uplink component carrier. In some examples, a resource for the second PUCCH is determined based at least in part on a resource for the first PUCCH. In some examples of the method, a resource for the first PUCCH is determined based at least in part on information within the first group of component carriers, and a resource for the second PUCCH is determined based at least in part on information within the second group of component carriers.

In some examples of the method, the first PUCCH is configured on a first uplink component carrier and the second PUCCH is configured on a second uplink component carrier. In some examples, the first uplink component carrier corresponds to a primary cell group, and the second uplink component carrier corresponds to a secondary cell group. In some examples of the method, the primary cell group is associated with a first base station, and the secondary cell group is associated with a second base station, the first base station and the second base station being in communication via a non-ideal backhaul link.

In some examples, the method includes determining a first power control value for the first PUCCH based on a hybrid automatic repeat request (HARQ) payload size for the plurality of downlink component carriers of the first group; and determining a second power control value for the second PUCCH based on a HARQ payload size for the at least one downlink component carrier of the second group. In some examples, the method includes adjusting a physical uplink shared channel (PUSCH) offset based on a hybrid automatic repeat request (HARQ) payload size for the plurality of downlink component carriers of the first group, a HARQ payload size for the at least one downlink component carrier of the second group, or a HARQ payload size of both the plurality of downlink component carriers of the first group and the at least one downlink component carrier of the second group.

In some examples, the method includes triggering aperiodic channel state information (CSI) reporting based on a number of component carriers of the first group of component carriers, a number of component carriers of the second group of component carriers, or a number of component carriers of both the first and the second groups of component carriers. In some examples of the method, a component carrier of the first group of component carriers or the second group of component carriers comprises a carrier segment. In some examples of the method, the first group of component carriers and the second group of component carriers comprise a time-division duplexing (TDD) carrier, a frequency-division duplexing (FDD) carrier, or a combination of TDD carriers and FDD carriers. In some examples, the method includes determining to transmit uplink control information on a physical uplink shared channel (PUSCH) based at least in part on channel state information (CSI) reports schedule on the first PUCCH and the second PUCCH.

In a second set of illustrative examples, an apparatus for wireless communication is described. In one example, the apparatus may include a processor, memory in electronic communication with the processor, and instructions stored in the memory. The instructions may be executable by the processor to indicate a capability of supporting more than five downlink component carriers or of supporting a dual physical uplink control channel (PUCCH) configuration; receive a multi-carrier configuration of more than five downlink component carriers comprising a first group of downlink component carriers and a second group of downlink component carriers; and to transmit at least one of a first PUCCH or a second PUCCH, the first PUCCH being associated with a downlink component carrier of the first group, and the second PUCCH being associated with a downlink component carrier of the second group. In some examples of the apparatus, the instructions may also be executable by the processor to implement one or more aspects of the method for wireless communication described above with respect to the first set of illustrative examples.

In a third set of illustrative examples, another apparatus for wireless communication is described. In one example, the apparatus may include means for indicating a capability of supporting more than five downlink component carriers or of supporting a dual physical uplink control channel (PUCCH) configuration; means for receiving a multi-carrier configuration of more than five downlink component carriers comprising a first group of downlink component carriers and a second group of downlink component carriers; and means for transmitting at least one of a first PUCCH or a second PUCCH, the first PUCCH being associated with a downlink component carrier of the first group, and the second PUCCH being associated with a downlink component carrier of the second group. In some examples, the apparatus may further include means for implementing one or more aspects of the method for wireless communication described above with respect to the first set of illustrative examples.

In a fourth set of illustrative examples, a non-transitory computer-readable medium storing computer-executable code for wireless communication is described. In one example, the code may be executable by a processor to indicating a capability of supporting more than five downlink component carriers or of supporting a dual physical uplink control channel (PUCCH) configuration receive a multi-carrier configuration of more than five downlink component carriers comprising a first group of downlink component carriers and a second group of downlink component carriers; and transmit at least one of a first PUCCH or a second PUCCH, the first PUCCH being associated with a downlink component carrier of the first group, and the second PUCCH being associated with a downlink component carrier of the second group. In some examples of the non-transitory computer-readable medium, the code may also be executable by the processor to implement one or more aspects of the method for wireless communication described above with respect to the first set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
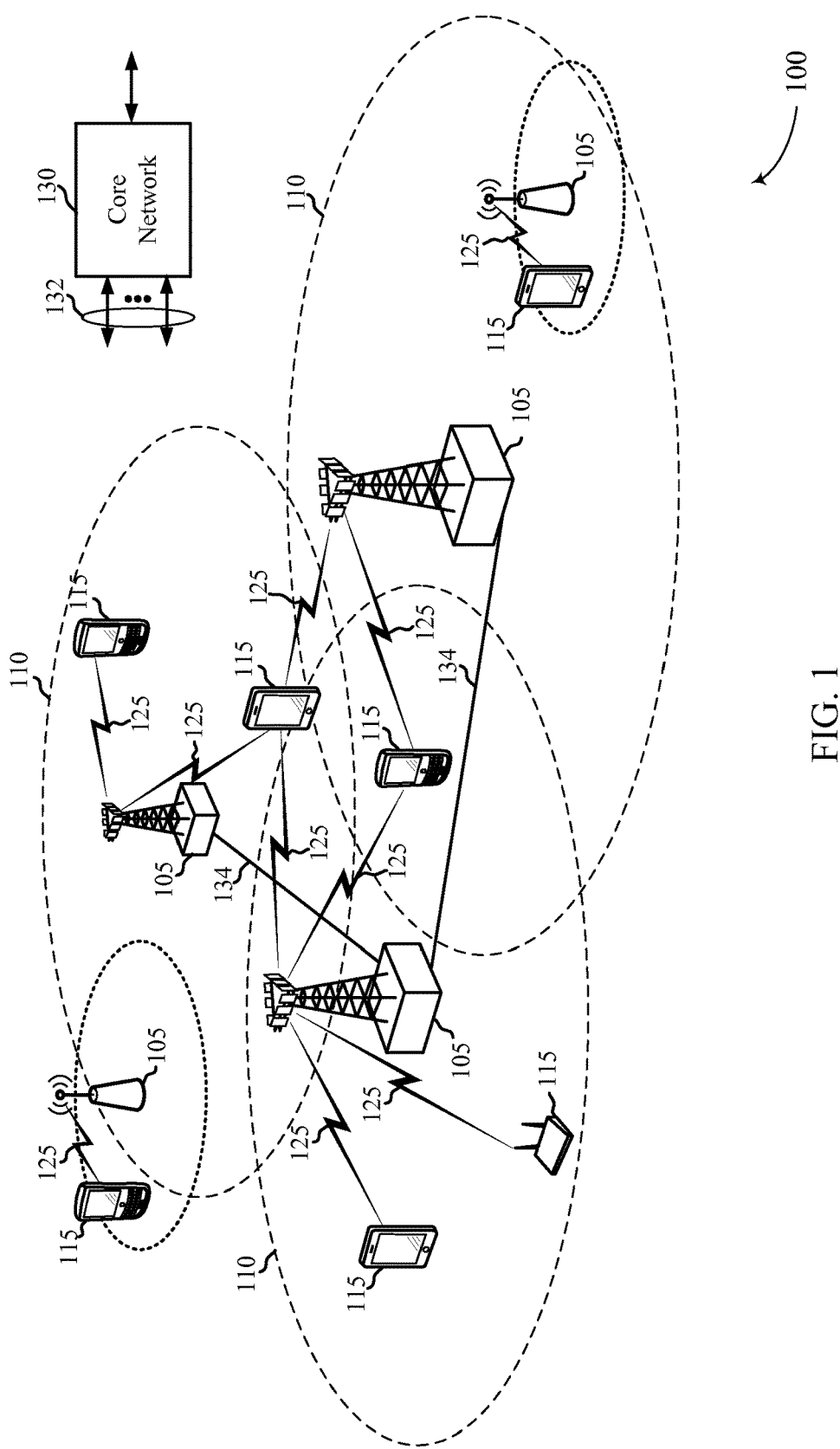
FIG. 1 shows a block diagram of a wireless communication system, in accordance with various aspects of the present disclosure.

Techniques are described for enabling component carriers for multi-carrier wireless communication. A variety of options for supporting large numbers of CCs are discussed. In various examples, a focus on control channel or data channel design may allow for an increase in CC usage. In some cases, maximizing usage of dual-connectivity or a dual-PUCCH in carrier aggregation may be beneficial. In still other examples, utilizing carrier segments to extend one CC up to 40 MHz may offer additional bandwidth flexibility. Various combinations of these techniques may be combined to limit the impact on various aspects of existing systems.

A capability of a UE or base station to support more than five downlink component carriers may be identified and/or indicated. A multi-carrier configuration may be received. The multi-carrier configuration may include a first group of component carriers and a second group of component carriers. The first group of component carriers may include a plurality of downlink component carriers. The second group of component carriers may include at least one downlink component carrier. A first physical uplink control channel (PUCCH), a second PUCCH, or a combination of the first PUCCH and the second PUCCH, may be transmitted. The first PUCCH may be associated with the plurality of downlink component carriers of the first group, and the second PUCCH may be associated with the at least one downlink component carrier of the second group.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein ma be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

FIG. 1 shows a block diagram of a wireless communication system 100, in accordance with various aspects of the present disclosure. The wireless communication system 100 includes base stations 105, communication devices, also known as user equipment (UE) 115, and a core network 130. The base stations 105 may communicate with the UEs 115 under the control of a base station controller (not shown), which may be part of the core network 130 or the base stations 105 in various examples. Base stations 105 may communicate control information or user data with the core network 130 through backhaul 132. In some examples, the base stations 105 may communicate, either directly or indirectly, with each other over backhaul links 134, which may be wired or wireless communication links.

The wireless communication system 100 may support operation on multiple carriers (e.g., waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, and the like. A particular combination of carriers may dictate a manner in which a UE 115 synchronizes with various carriers of a base station 105. As described below, a UE 115 may be served from various base stations 105, some of which may be configured with multiple carriers.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a basic service set (BSS), an extended service set (ESS), a NodeB, an eNodeB (eNB), a Home NodeB, a Home eNodeB, or some other suitable terminology. The coverage area 110 for a base station 105 may be divided into sectors making up a portion of the coverage area (not shown). The wireless communication system 100 may include base stations 105 of different types (e.g., macro, micro, or pico base stations). There may be overlapping coverage areas for different technologies.

In some examples, the wireless communication system 100 is an LTE/LTE-A network. In LTE/LTE-A networks, the terms evolved Node B (eNB) and UE may be generally used to describe the base stations 105 and UEs 115, respectively. The wireless communication system 100 may be a Heterogeneous LTE/LTE-A network in which different types of base stations 105 provide coverage for various geographical regions. For example, each base station 105 may provide communication coverage for a macro cell, a small cell, or other types of cell. The term "cell" is a 3GPP term that can be used to describe a base station, a carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station that may operate in the same or different (e.g., licensed, unlicensed, etc.) frequency bands as macro cells. Small cells include pico cells, femto cells, and micro cells. A pico cell would generally cover a relatively smaller geographic area and may allow unrestricted access by UEs with service subscriptions with the network provider. A femto cell would also generally cover a relatively small geographic area (e.g., a home) and may provide restricted access by UEs having an association with the femto cell (e.g., UEs in a closed subscriber group (CSG), UEs for users in the home, and the like). A base station for a macro cell may be referred to as a macro eNB. A base station for a pico cell may be referred to as a pico eNB. And, a base station for a femto cell may be referred to as a femto eNB or a home eNB. A base station 105 may support one or multiple (e.g., two, three, four, and the like) cells.

The core network 130 may communicate with the base stations 105 via a backhaul 132 (e.g., S1, etc.). The base stations 105 may also communicate with one another, e.g., directly or indirectly via backhaul links 134 (e.g., X2, etc.) or via backhaul 132 (e.g., through core network 130). The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid Automatic Repeat Request (HARM) to provide retransmission at the MAC layer to improve link efficiency. In the control plane, the Radio Resource Control (RRC) protocol layer may provide establishment, configuration, and maintenance of an RRC connection between the UE and the network used for the user plane data. At the Physical (PHY) layer, the transport channels may be mapped to Physical channels.

The UEs 115 may be dispersed throughout the wireless communication system 100. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, etc. A UE 115 may be able to communicate with macro eNBs, pico eNBs, femto eNBs, relays, and the like. A UE 115 may also be able to communicate over different types of access networks, such as cellular or other WWAN access networks, or WLAN access networks. In some modes of communication with a UE 115, communication may be conducted over a plurality of communication links 125 (i.e., carriers), with each communication links 125 using a carrier between the UE 115 and one of a number of cells (e.g., serving cells, which cells may in some cases be operated by the same or different base stations 105).

Each carrier may be provided over a licensed radio frequency spectrum band or an unlicensed radio frequency spectrum band. Broadly speaking, the unlicensed spectrum in some jurisdictions may range from 600 Megahertz (MHz) to 6 Gigahertz (GHz). As used herein, the terms "unlicensed radio frequency spectrum," "unlicensed spectrum," or "shared spectrum" may thus refer to industrial, scientific and medical (ISM) radio bands, irrespective of the frequency of those bands. In some examples, unlicensed spectrum is the U-NII radio band, which may also be referred to as the 5 GHz or 5 G band. By contrast, the terms "licensed radio frequency spectrum," "licensed spectrum," or "cellular spectrum" may be used herein to refer to wireless spectrum utilized by wireless network operators under administrative license from a governing agency. A set of carriers used in a particular mode of communication may all be received (e.g., at a UE 115) over the licensed radio frequency spectrum band, all be received (e.g., at a UE 115) over the unlicensed radio frequency spectrum band, or be received (e.g., at a UE 115) over a combination of the licensed radio frequency spectrum band and the unlicensed radio frequency spectrum band.

The communication links 125 shown in wireless communication system 100 may include uplink (UL) transmissions from a UE 115 to a base station 105, or downlink (DL) transmissions, from a base station 105 to a UE 115. The downlink transmissions may also be called forward link transmissions, and the uplink transmissions may also be called reverse link transmissions. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined. The DL transmissions or UL transmissions may be made using the licensed radio frequency spectrum band, the unlicensed radio frequency spectrum band, or both.

The wireless communication system 100 may support operation on multiple carriers, which may be referred to as multi-carrier configuration, carrier aggregation (CA), or dual-connectivity. A carrier may also be referred to as a component carrier (CC), a layer, a channel, etc. The term "component carrier" may refer to each of the multiple carriers utilized by a UE in carrier aggregation (CA) operation, and may be distinct from other portions of system bandwidth. For instance, a component carrier may be a relatively narrow-bandwidth carrier susceptible of being utilized independently or in combination with other component carriers. Each individual component carrier may provide the same capabilities as, for instance, a single carrier based on release 8 or release 9 of the LTE standard. Multiple component carriers may be aggregated or utilized concurrently to provide some UEs 115 with greater bandwidth and, e.g., higher data rates. Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode. A carrier used for the downlink may be referred to as a downlink CC, and a carrier used for the uplink may be referred to as an uplink CC. A cell may include uplink and downlink CCs. A UE 115 may be configured with multiple downlink CCs and one or more uplink CCs for multi-carrier operation. The multi-carrier configuration may be used with various combinations of FDD and TDD component carriers. The component carriers may utilize the licensed radio frequency spectrum band, the unlicensed radio frequency spectrum band, or a combination of the licensed and unlicensed radio frequency spectrum bands.

In some examples, the various UEs 115 are each configured with a UE-specific primary component carrier (PCC) (also referred to as a "primary cell" or "PCell") or one or more secondary component carriers (also referred to as a "secondary cells" or "SCells"). The PCell may utilize the licensed radio frequency spectrum band, and the SCells may, in some examples, utilize the licensed or unlicensed radio frequency spectrum bands. In other examples, both the PCell and the SCells may utilize the licensed radio frequency spectrum bands or the unlicensed radio frequency spectrum bands.

The PCell may include a downlink PCC and an uplink PCC. An SCell may include a downlink SCC and, if configured, an uplink SCC. Control information including scheduling for SCells may be performed on the SCell or on a different cell (PCell or SCell), which may be referred to as cross-carrier control signaling. The PCell may be identified by the UE 115 prior to establishing a connection with base station 105 (e.g., as the strongest available carrier). Once the UE 115 establishes a connection with a base station 105 via the PCell, one or more SCells may be configured via higher layer signaling (e.g., RRC, etc.). Configuration of SCells may include, for example, sending all system information (SI) for the SCell over RRC signaling. Groups of cells configured to be scheduled from another cell may be referred to as associated cells or associated CCs.

In some cases, both the PCell and SCells are supported by the same base station 105. In other cases, the PCell may be supported by one base station 105 and one or more SCells may be supported by the same base station 105 or a different base station 105. The techniques described herein may be applied to a multi-carrier scheme with a PCell and any number of SCells supported by one or more base stations 105. A configuration in which a UE 115 is served from different base stations 105 may be referred to as a dual-connectivity configuration. In dual-connectivity, one or more of the base stations 105 may support carrier aggregation.

In some examples, a UE 115 may be configured with five component carriers (CCs) for multi-carrier operation with one or more base stations 105. Each CC may utilize up to 20 MHz of bandwidth and may be backward compatible with devices implementing previous versions (e.g., Releases 8 and 9) of LTE. Therefore, in some examples, 100 MHz of bandwidth may be configured for a UE. The CCs in the multi-carrier configuration may all be FDD carriers, they may all be TDD carriers, or they may be a mixture of FDD and TDD carriers. Different TDD CCs may have the same or different uplink/downlink configuration. For example, special sub-frames may be configured separately for different uplink CCs or different downlink CCs.

Alternatively, a UE 115 may be configured with more than five CCs for multi-carrier operation with one or more base stations 105. To support more than five CCs, various control or data channel configurations may be implemented. And, in some cases, each CC may utilize 20 MHz or more of bandwidth in the licensed or the unlicensed radio frequency spectrum bands. Therefore, a UE 115 may utilize more than 100 MHz of bandwidth.

In some examples, one CC of a cell may be designated as the primary CC (PCC). The PCC may carry a physical uplink control channel (PUCCH) and a common search space for a PDCCH. In such cases, CCs other than the PCC may not carry the PUCCH. In other examples of a multi-carrier configuration, two CCs may be configured to carry PUCCHs. For instance, the PCC may be configured to carry a PUCCH and a SCC may also be configured to carry a PUCCH.

The PUCCHs in a multi-carrier configuration may include pre-defined formats. For example, PUCCH Format 1b with channel selection may include up to four bits for an acknowledgement/negative acknowledgement (ACK/NACK) payload. The ACK/NACK payload may be, for example, a hybrid automatic repeat request (HARD) payload. With PUCCH Format 1b, if the number of bits needed to indicate the ACK/NACK is less than or equal to four bits, then bundling of the ACK/NACK payload may not be used. But if the number of bits needed to indicate the ACK/NACK would be larger than four bits, then spatial bundling with time-domain bundling may be used for the ACK/NACK payload. As another example, PUCCH Format 3 may include up to 20 bits for an ACK/NACK payload. With PUCCH Format 3, if the number of bits needed to indicate the ACK/NACK is less than or equal to 20 bits, then bundling of the ACK/NACK payload may not be used. But if the number of bits needed to indicate the ACK/NACK would be larger than 20 bits, then spatial bundling may be used for the ACK/NACK payload. In some instances, ACK/NACK bundling in the time domain may include transmitting a single acknowledgement for multiple codewords spread across multiple subframes. This may include performing a logical 'AND' operation of acknowledgements across multiple downlink subframes associated with a particular uplink subframe. Spatial bundling may include condensing acknowledgements from multiple codewords on different spatial layers within the same subframe into a single acknowledgement, such as by performing a logical 'AND' operation on the plurality of acknowledgements. Accordingly, ACK/NACK bundling may indicate whether zero or more than zero transport blocks in a group of downlink codewords were transmitted in error.

In some examples, cells (e.g., base stations 105 having component carriers serving a common UE 115) may not have an ideal backhaul. Consequently, very tight coordination between the cells may not be possible, due to limited backhaul capacity or non-negligible backhaul latency (e.g., latency in the tens of milliseconds). In such examples, certain dual-connectivity implementations may address issues associated with non-ideal backhaul between cells. For example, cells may be partitioned into two groups—the primary cell group (PCG) and the secondary cell group (SCG). The carriers of each group may be aggregated to serve a UE 115. In some examples, each group may each have a cell carrying PUCCH. For example, a PCell in the PCG may carry a PUCCH for the PCG. A SCell in the SCG may carry the PUCCH for the SCG. The PUCCH for the SCG may also be referred to as the PUCCH SCell. Thus, a UE 115 may be configured to provide feedback to the various cell groups despite a non-ideal backhaul.

Additionally or alternatively, certain dual-connectivity solutions may provide for a common search space to be monitored in the SCG by a UE 115. In some examples, uplink control information may be separately conveyed to each group via the PUCCH in each group. And, in some cases, semi-persistent scheduling (SPS) and scheduling request (SR) may also be supported in the SCG.

Additional benefits of dual-connectivity, and carrier aggregation, may also be realized if large numbers of CCs or large bandwidth operation is supported within the wireless communication system 100. To achieve this, additional frequency spectrum provided by an unlicensed radio frequency spectrum band (e.g., the LTE-U frequency spectrum band) may be leveraged. For example, in LTE-U, the total available bandwidths may be larger than 100 MHz (e.g., 160 MHz), and the total available bandwidths may be aggregated with CCs in the licensed radio frequency spectrum band.

Alternatively, additional bandwidth may realized by defining CCs having a bandwidth larger than often utilized in LTE systems—e.g., bandwidths larger than 20 MHz. For instance, CCs having 40 MHz, 80 MHz, 160 MHz, etc. may be defined. However, these large CCs may require significant changes to existing systems and devices in order to be implemented. For example, the additional system bandwidths, the details of each bandwidth (e.g., physical layer parameters dependent on the system bandwidth), and the performance requirements may need to be indicated.

To avoid issues associated with larger bandwidth carriers, the system bandwidth for each carrier may be limited to 20 MHz, but the number of CCs aggregated for a UE 115 may be larger than five. For example, 10 CCs may be aggregated for a UE 115. The 10 CCs may include two CCs in the licensed radio frequency spectrum band (each CC using 20 MHz of bandwidth, for a total of 40 MHz of licensed bandwidth), and eight CCs in the unlicensed radio frequency spectrum (each CC using 20 MHz of bandwidth, for a total of 160 MHz of unlicensed bandwidth).

In some examples, more than five CCs may be implemented using a multi-carrier configuration. For example, a base station 105 and a UE 115 may use more than five 20 MHz CCs to communicate in a carrier aggregation implementation. Additionally or alternatively, one or more base stations 105 and a UE 115 may use more than five 20 MHz CCs by utilizing two groups of CCs (e.g., dual connectivity with a PCG and a SCG). In some examples, one or more base stations 105 and a UE 115 may use more than five CCs, where at least one of the CCs has a bandwidth larger than 20 MHz. The CC with a bandwidth larger than 20 MHz may utilize a primary carrier and at least one carrier segment. In some instances, a carrier segment may be additional bandwidth that is utilized by or treated as an "extension" of a CC. A 20 MHz base carrier may, for example, include an additional 20 MHz segment. The 20 MHz base carrier may be combined with the 20 MHz segment, which may result in a 40 MHz "jumbo" CC. The "jumbo" CC may be treated as one CC in terms of physical downlink shared channel (PDSCH) and physical uplink shared channel (PUSCH) mapping. In such cases, DL control or UL control may be present in the base carrier and not the carrier segment. With this arrangement, up to 200 MHz of bandwidth may be aggregated.

Additional options for supporting larger numbers of CCs or increased bandwidth utilizing various combinations of control and data channel arrangements are discussed with reference to FIGS. 2A, 2B, 3, and 4A-4C. Many or all of the described techniques may be utilized in combination.

Figure 2A:
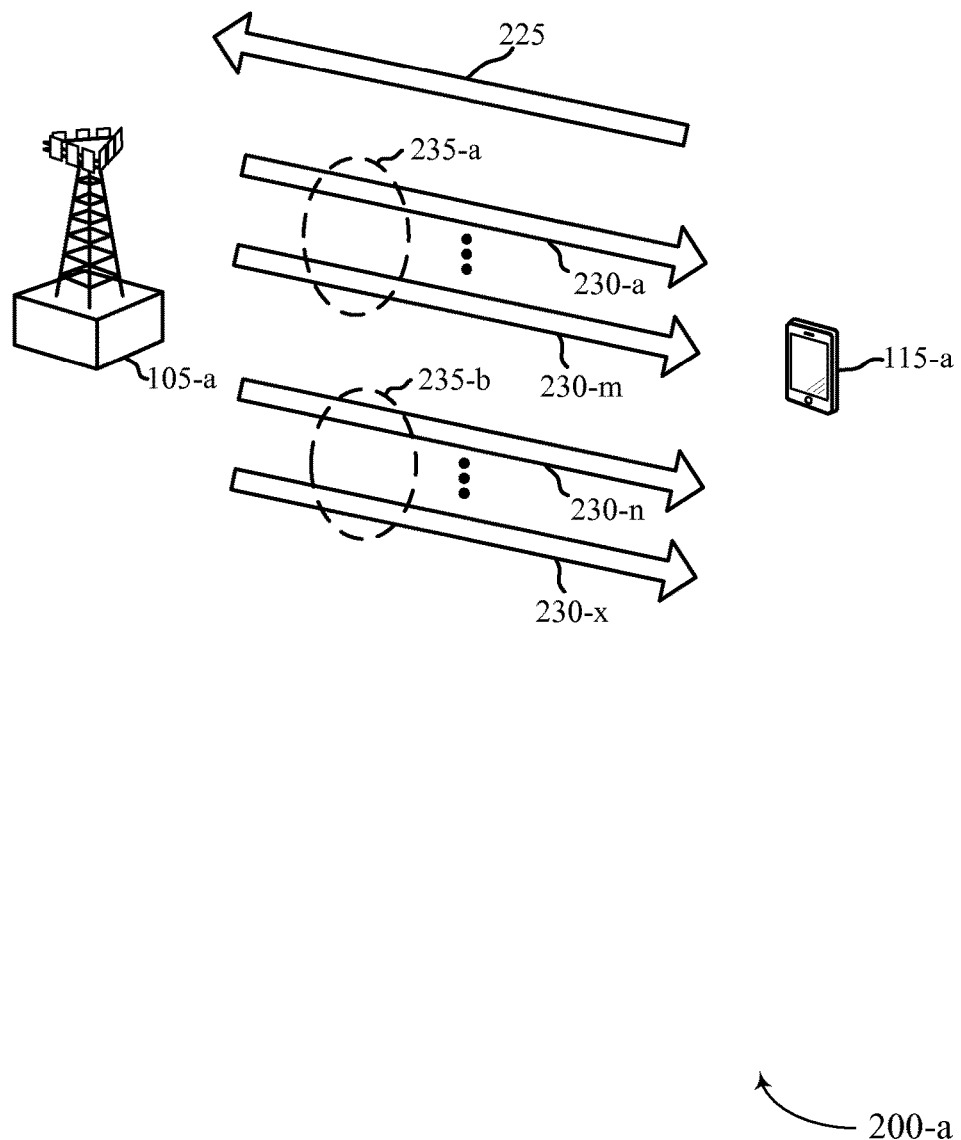
FIG. 2A illustrates an example of a wireless communication system with a UE served by groups of component carriers, in accordance with various aspects of the present disclosure.

FIG. 2A illustrates an example of a wireless communication system 200-a with a UE 115-a served by groups of CCs, in accordance with various aspects of the present disclosure. The wireless communication system 200-a may be an example of various aspects of the wireless communication system 100 of FIG. 1.

In some examples, the UE 115-a may be served by a first group of CCs 235-a and a second group of CCs 235-b. The first group of CCs 235-a may include M downlink CCs 230-a through 230-m, where M is at least one. The second group of CCs 235-b may include X downlink CCs 230-n through 230-x, where X is at least one. In some examples, the total of M and X may be more than five, resulting in the UE 115-a being served by more than five downlink CCs. The UE 115-a may also be configured with an uplink CC 225. The uplink CC 225 may be a CC of a PCell. In some examples, the uplink CC 225 may be an uplink CC of the first group of CCs 235-a or an uplink CC of the second group of CCs 235-b.

In some examples, the first group of CCs 235-a may be a primary cell group (PCG) having a primary cell (PCell). The PCell may include an uplink primary CC. In some examples, the uplink primary CC may be the uplink CC 225. The second group of CCs 235-b may be a secondary cell group (SCG) having one or more secondary cells (SCells). The first group of CCs 235-a, the second group of CCs 235-b, and the uplink CC 225 may include one or more carriers in the licensed radio frequency spectrum or the unlicensed radio frequency spectrum. In some examples, the first group of CCs 235-a, the second group of CCs 235-b, and the uplink CC 225 may be supported by the same base station 105-a.

In some examples, the first group of CCs 235-a, the second group of CCs 235-b, and the uplink CC 225 include FDD carriers. In other examples, the first group of CCs 235-a, the second group of CCs 235-b, and the uplink CC 225 include both FDD and TDD carriers. One or more physical uplink control channels (PUCCHs) may be configured on the uplink CC 225. In some cases, the PUCCH may not be configured on carriers or cells other than a PCell. Thus, multiple-carrier implementations may be realized by modifying and leveraging various HARQ transmission options, including bundling.

The uplink CC 225 may be an FDD carrier of the PCell. The PUCCH may provide HARQ feedback. In some examples, the PUCCH may be configured with up to 20 bits for HARQ feedback. The 20 bits may support up to 10 downlink CCs. Thus, bundling of the HARQ feedback may not be necessary, and a standard PUCCH format may be utilized.

In some cases, the HARQ feedback may be bundled to use fewer bits. Given N total downlink CCs, the number of ACK/NACK bits for HARQ feedback may be reduced to less than or equal to 2N if spatial bundling is utilized for some of the CCs. The number of ACK/NACK bits for HARQ feedback may be reduced as low as N, if spatial bundling is utilized for all CCs. For example, with 10 downlink CCs (N=10) in a multi-carrier configuration, if spatial bundling is utilized for all 10 downlink CCs, then there may be as few as 10 bits for HARQ feedback. In some examples, the bundling of the HARQ feedback may be in the CC domain—e.g., a single ACK/NACK may be utilized to provide feedback for several CCs. However, if the PUCCH format is modified to support parallel PUCCH transmissions, then bundling of the HARQ feedback may not be necessary.

In some examples, the uplink CC 225 may be a TDD carrier of the PCell. When the PCell is TDD, the number of downlink CCs that may be aggregated for a UE may be limited. Given N CCs, and downlink (DL) association set size Y (e.g., Y DL subframes associated with one uplink subframe in terms of DL HARQ timing), the required number of bits for HARQ feedback after spatial bundling (e.g., one bit per subframe per CC) may be N*Y. For example, if N=10 and Y=4, then 40 bits may be required for HARQ feedback. Conventional PUCCH formats may not support more than 20 bits. Therefore, the number of CCs that may be supported with conventional PUCCH formats with a TDD PCell may be limited by 20/Y. For example, for Y=2, up to N=10 CCs may be supported; for Y=3, up to 6 CCs may be supported; for Y=4, up to 5 CCs may be supported; and for Y=9, up to 2 CCs may be supported.

In some cases, however, additional bundling of the HARQ feedback may be utilized without modifying the PUCCH format. For example, in addition to spatial bundling, CC domain bundling or time-domain bundling may be utilized. However, for Y=2, no additional bundling—beyond spatial bundling—may be necessary for any N<=10. For Y=3, no additional bundling—beyond spatial bundling—may be necessary for any N<=6. But if N>6, then spatial bundling and time-domain bundling may be utilized. For example, time-domain bundling may be performed for the 2nd and 3rd subframes in the set of Y=3 subframes. Time-domain bundling may also be dependent on the subframe set.

In some examples with a TDD PCell, the PUCCH format may be modified to support the additional CCs. Additionally or alternatively, two or more parallel PUCCHs may be transmitted to support the additional CCs. In some cases, the use of modified PUCCH format or the parallel PUCCHs may be dependent on N or Y. For Y=2 and N<=10, the modified PUCCH format or parallel PUCCH transmissions may not be necessary. For Y=3 and N<=6, the modified PUCCH format or parallel PUCCH transmissions may also not be necessary. While for Y=3 and N>6, the modified PUCCH format or parallel PUCCH transmissions may be utilized to support the additional CCs. For Y=4 and N<=5, the modified PUCCH format or parallel PUCCH transmissions may not be necessary. While for Y=4 and N>5, the modified PUCCH format or parallel PUCCH transmissions may be utilized to support the additional CCs. For Y=9 and N<=2, the modified PUCCH format or parallel PUCCH transmissions may not be necessary. While for Y=9 and N=3 or 4, the modified PUCCH format or parallel PUCCH transmissions may be utilized to support the additional CCs. Support for Y=9 and N>4 CCs may not be available with conventional LTE.

In some examples, the modified PUCCH format or parallel PUCCH transmissions may also be utilized for additional bundling of the HARQ feedback. The additional bundling of the HARQ feedback may be dependent on N or Y as described above.

Returning to FIG. 2A, the uplink CC 225 may be configured with two or more parallel PUCCHs. For example, the uplink CC 225 may be configured with a first PUCCH and a second PUCCH. The first PUCCH may be associated with the downlink CCs 230-a through 230-m of the first group of CCs 235-a. The second PUCCH may be associated with the downlink CCs 230-n through 230-x of the second group of CCs 235-b. The first and second PUCCHs may allow the UE 115-a to utilize more than five downlink CCs from the base station 105-a. The first and second PUCCHs may be transmitted in parallel (in either time or frequency) on the uplink CC 225.

Figure 2B:
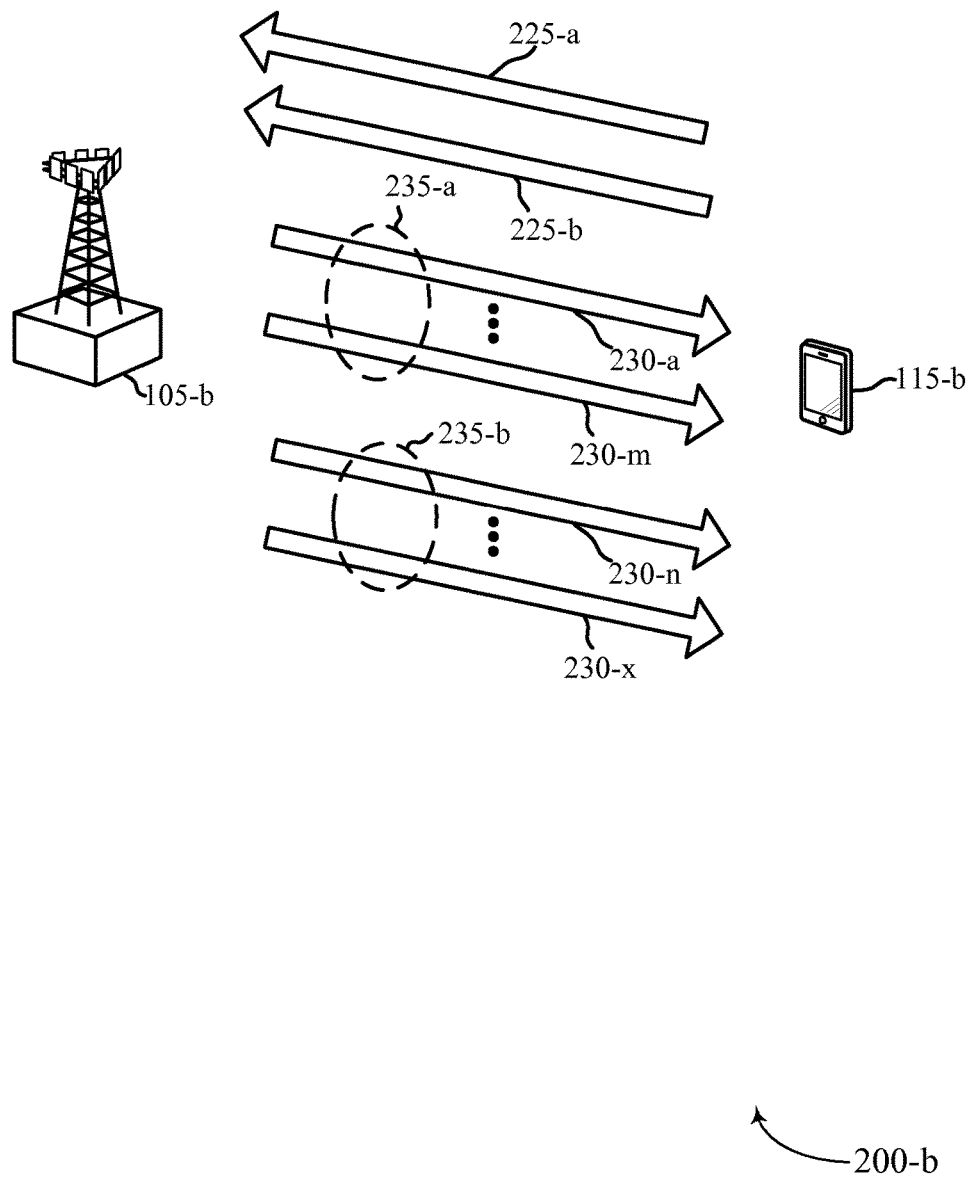
FIG. 2B illustrates another example of a wireless communication system with a UE served by groups of component carriers, in accordance with various aspects of the present disclosure.

FIG. 2B illustrates another example of a wireless communication system 200-b with a UE 115-b served by groups of CCs, in accordance with various aspects of the present disclosure. The wireless communication system 200-b may be an example of various aspects of the wireless communication system 100 of FIG. 1. In some examples, the UE 115-b may be served by a first group of CCs 235-a and a second group of CCs 235-b. The first group of CCs 235-a may include M downlink CCs 230-a through 230-m, where M is at least one. The second group of CCs 235-b may include X downlink CCs 230-n through 230-x, where X is at least one. In some examples, the total of M and X may be more than five, resulting in the UE 115-b being served by more than five downlink CCs. The UE 115-b may also be configured with a first uplink CC 225-a and a second uplink CC 225-b. In some examples, the first uplink CC 225-a may be an uplink CC of the first group of CCs 235-a. The second uplink CC 225-b may be an uplink CC of the second group of CCs 235-b.

In some examples, the first group of CCs 235-a may be a primary cell group (PCG) having a primary cell (PCell). The PCell may include an uplink primary CC. In some examples, the uplink primary CC may be the first uplink CC 225-a. The second group of CCs 235-b may be a secondary cell group (SCG) having one or more secondary cells (SCells). The SCG may include a PUCCH-SCell. In some examples, the PUCCH-SCell may include the second uplink CC 225-b. The first group of CCs 235-a, the second group of CCs 235-b, the first uplink CC 225-a, and the second uplink CC 225-b may include one or more carriers in the licensed radio frequency spectrum or the unlicensed radio frequency spectrum. In some examples, the first group of CCs 235-a, the second group of CCs 235-b, the first uplink CC 225-a, and the second uplink CC 225-b may be supported by the same base station 105-b.

In some examples, the first group of CCs 235-a, the second group of CCs 235-b, the first uplink CC 225-a, and the second uplink CC 225-b include FDD carriers. In other examples, the first group of CCs 235-a, the second group of CCs 235-b, the first uplink CC 225-a, and the second uplink CC 225-b may include both FDD and TDD carriers. One or more physical uplink control channels (PUCCHs) may be configured on the first uplink CC 225-a, the second uplinnk CC 225-b, or both the first and second uplink CCs 225-a and 225-b.

In some examples, the first uplink CC 225-a may be configured with a first PUCCH. The first PUCCH may be associated with the downlink CCs 230-a through 230-m of the first group of CCs 235-a. The second uplink CC 225-b may be configured with a second PUCCH. The second PUCCH may be associated with the downlink CCs 230-n through 230-x of the second group of CCs 235-b. The first and second PUCCHs may allow the UE 115-b to utilize more than five downlink CCs from the base station 105-b.

Figure 3:
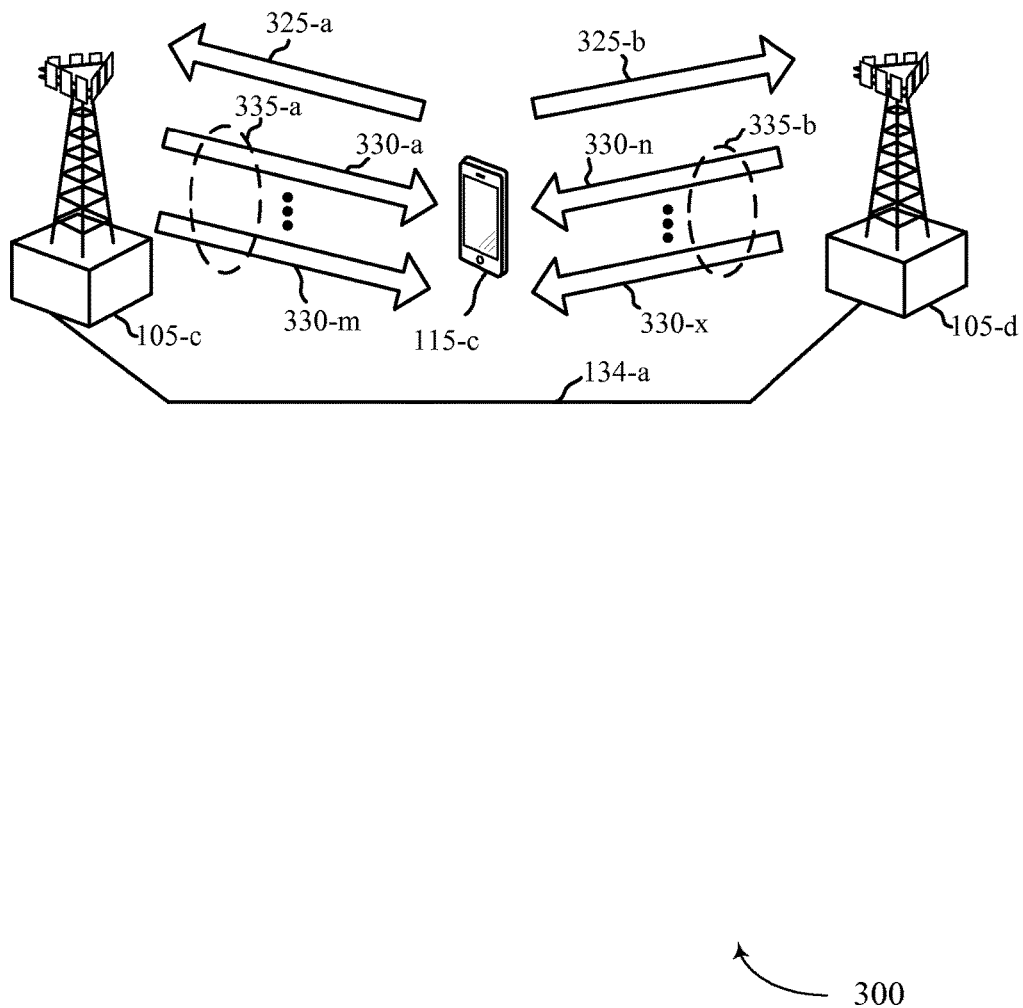
FIG. 3 illustrates another example of a wireless communication system with a UE served by groups of component carriers, in accordance with various aspects of the present disclosure.

FIG. 3 illustrates another example of a wireless communication system 300 with a UE 115-c served by groups of CCs, in accordance with various aspects of the present disclosure. The wireless communication system 300 may be an example of various aspects of the wireless communication system 100 of FIG. 1. In some examples, the UE 115-c may be served by a first group of CCs 335-a associated with a first base station 105-c. The UE 115-c may also be served by a second group of CCs 335-b associated with a second base station 105-d. The first base station 105-c and the second base station 105-d may be connected by a backhaul link 134-a. In a dual-connectivity scenario, the backhaul link 134-a may be non-ideal or non-existent. For example, the backhaul link 134-a may cause communications between the base stations 105-c and 105-d to suffer delays, which may limit the effectiveness of communication between the base stations 105-c and 105-d.

The first group of CCs 335-a may include M downlink CCs 330-a through 330-m, where M is at least one. The second group of CCs 335-b may include X downlink CCs 330-n through 330-x, where X is at least one. In some examples, the total of M and X may be more than five, resulting in the UE 115-c being served by more than five downlink CCs. The UE 115-c may also be configured with a first uplink CC 325-a and a second uplink CC 325-b. In some examples, the first uplink CC 325-a may be an uplink CC of the first group of CCs 335-a. The first uplink CC 325-a may be associated with the first base station 105-c. The second uplink CC 325-b may be an uplink CC of the second group of CCs 335-b; and the second uplink CC 325-b may be associated with the second base station 105-d.

In some examples, the first group of CCs 335-a may be a primary cell group (PCG) having a primary cell (PCell). The PCell may include an uplink primary CC. In some examples, the uplink primary CC may be the first uplink CC 325-a. The second group of CCs 335-b may be a secondary cell group (SCG) having one or more secondary cells (SCells). The SCG may also include a PUCCH-SCell having an uplink secondary CC. In some examples the uplink secondary CC of the PUCCH-SCell may be the second uplink CC 325-b. The first group of CCs 335-a, the second group of CCs 335-b, the first uplink CC 325-a, and the second uplink CC 325-b may include one or more carriers in the licensed radio frequency spectrum or the unlicensed radio frequency spectrum.

In some examples, the first group of CCs 335-a, the second group of CCs 335-b, the first uplink CC 325-a, and the second uplink CC 325-b may include FDD carriers. In other examples, the first group of CCs 335-a, the second group of CCs 335-b, the first uplink CC 325-a, and the second uplink CC 325-b may include both FDD and TDD carriers. One or more physical uplink control channels (PUCCHs) may be configured on the first uplink CC 325-a, the second uplink CC 325-b, or both the first and second uplink CCs 325-a and 325-b.

In some examples, the first uplink CC 325-a may be configured with a first PUCCH. The first PUCCH may be associated with the downlink CCs 330-a through 330-m of the first group of CCs 335-a. The second uplink CC 325-b may be configured with a second PUCCH. The second PUCCH may be associated with the downlink CCs 330-n through 330-x of the second group of CCs 335-b. The first and second PUCCHs may allow the UE 115-c to utilize more than five downlink CCs from the first base station 105-c and the second base station 105-d. For instance, each uplink CC 325 may utilize one or more of the various HARQ bundling techniques discussed above, such that each PUCCH may provide feedback for more than five CCs.

Figure 4A:
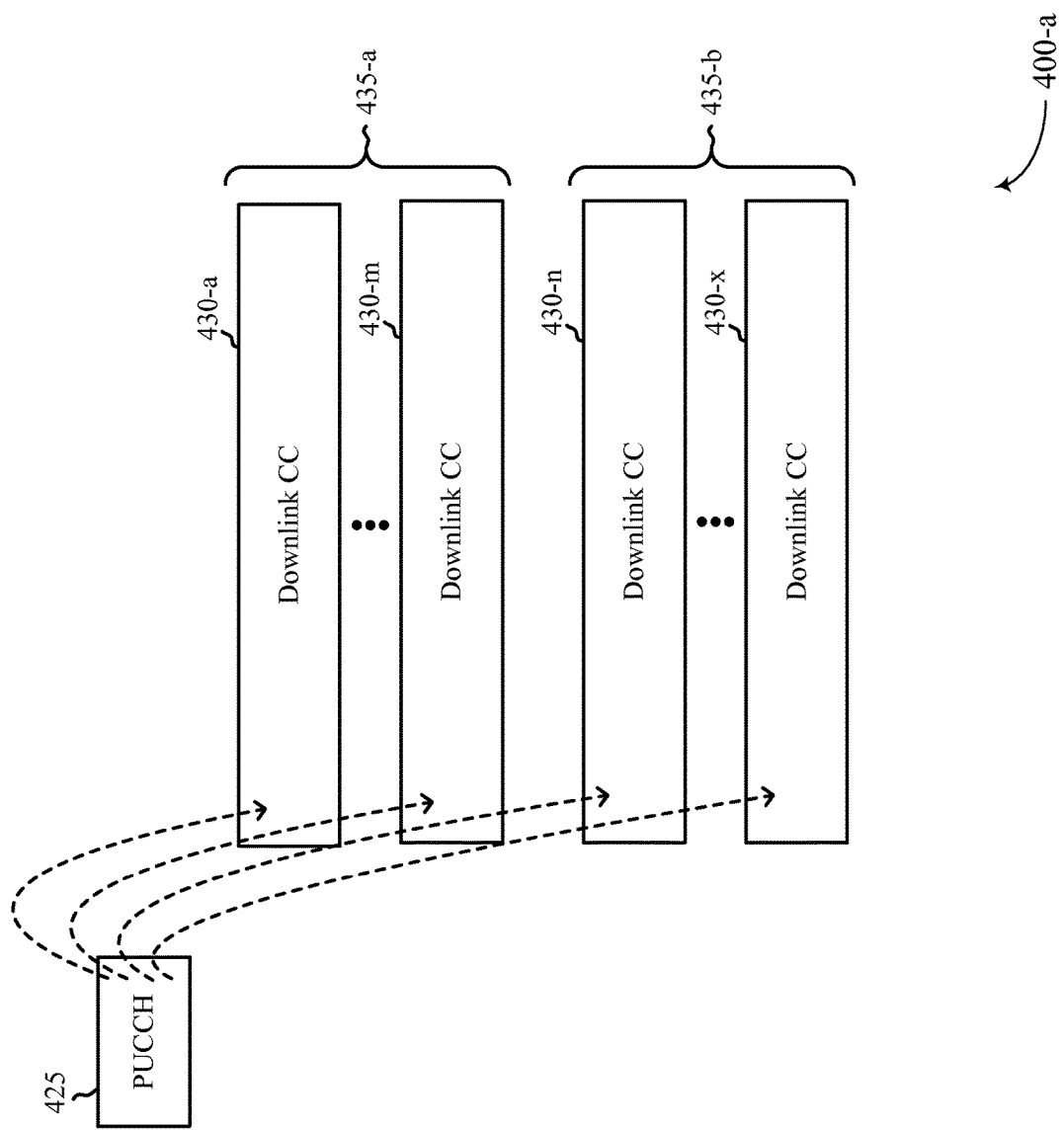
FIG. 4A illustrates an example of component carriers in a wireless communication system, in accordance with various aspects of the present disclosure.

FIG. 4A illustrates an example of CCs in a wireless communication system 400-a, in accordance with various aspects of the present disclosure. The wireless communication system 400-a may be an example of various aspects of the wireless communication system 100 or 200-a of FIGS. 1 and 2A. An uplink CC 425 may be configured with a PUCCH. The PUCCH may be associated with multiple groups of CCs. The PUCCH may thus provide feedback, including HARQ feedback, for multiple groups of CCs. A first group of CCs 435-a may include M downlink CCs 430-a through 430-m, where M is at least one. A second group of CCs 435-b may include X downlink CCs 430-n through 430-x, where X is at least one. In some examples, the total of M and X may be more than five, resulting in the PUCCH of the uplink CC 425 being associated with more than five downlink CCs.

Figure 4B:
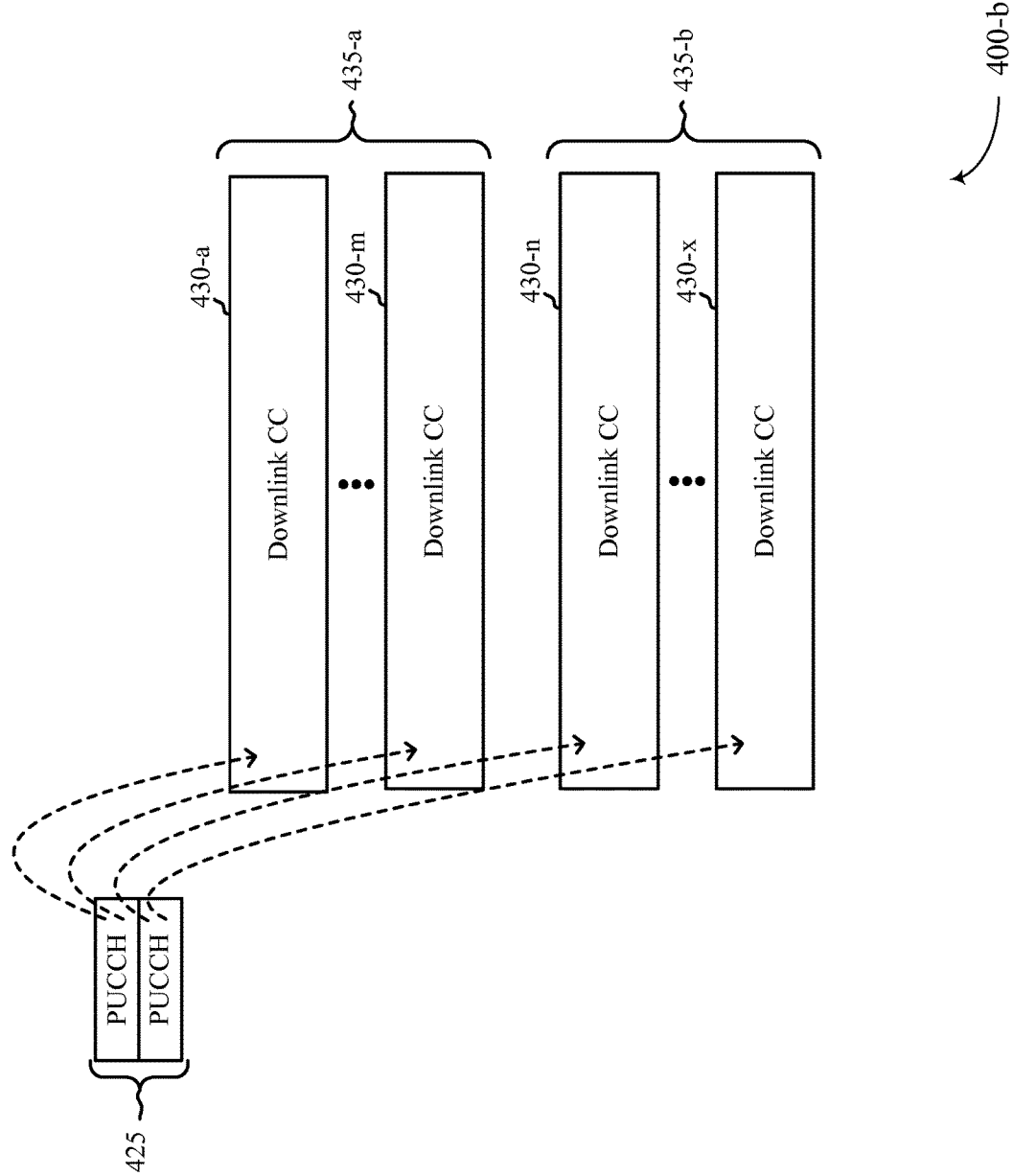
FIG. 4B illustrates another example of component carriers in a wireless communication system, in accordance with various aspects of the present disclosure.

FIG. 4B illustrates another example of CCs in a wireless communication system 400-b, in accordance with various aspects of the present disclosure. The wireless communication system 400-b may be an example of various aspects of the wireless communication system 100 or 200-a of FIGS. 1 and 2A. An uplink CC 425 may be configured with two parallel PUCCHs. The parallel PUCCHs may be parallel in time or frequency. The PUCCHs may thus be on a common uplink CC 425. A first PUCCH of the uplink CC 425 may be associated with a first group of CCs 435-a. The first group of CCs 435-a may include M downlink CCs 430-a through 430-m, where M is at least one. A second PUCCH of the uplink CC 425 may be associated with a second group of CCs 435-b. The second group of CCs 435-b may include X downlink CCs 430-n through 430-x, where X is at least one. In some examples, the total of M and X may be more than five, resulting in the two parallel PUCCHs of the uplink CC 425 being associated with more than five downlink CCs.

Figure 4C:
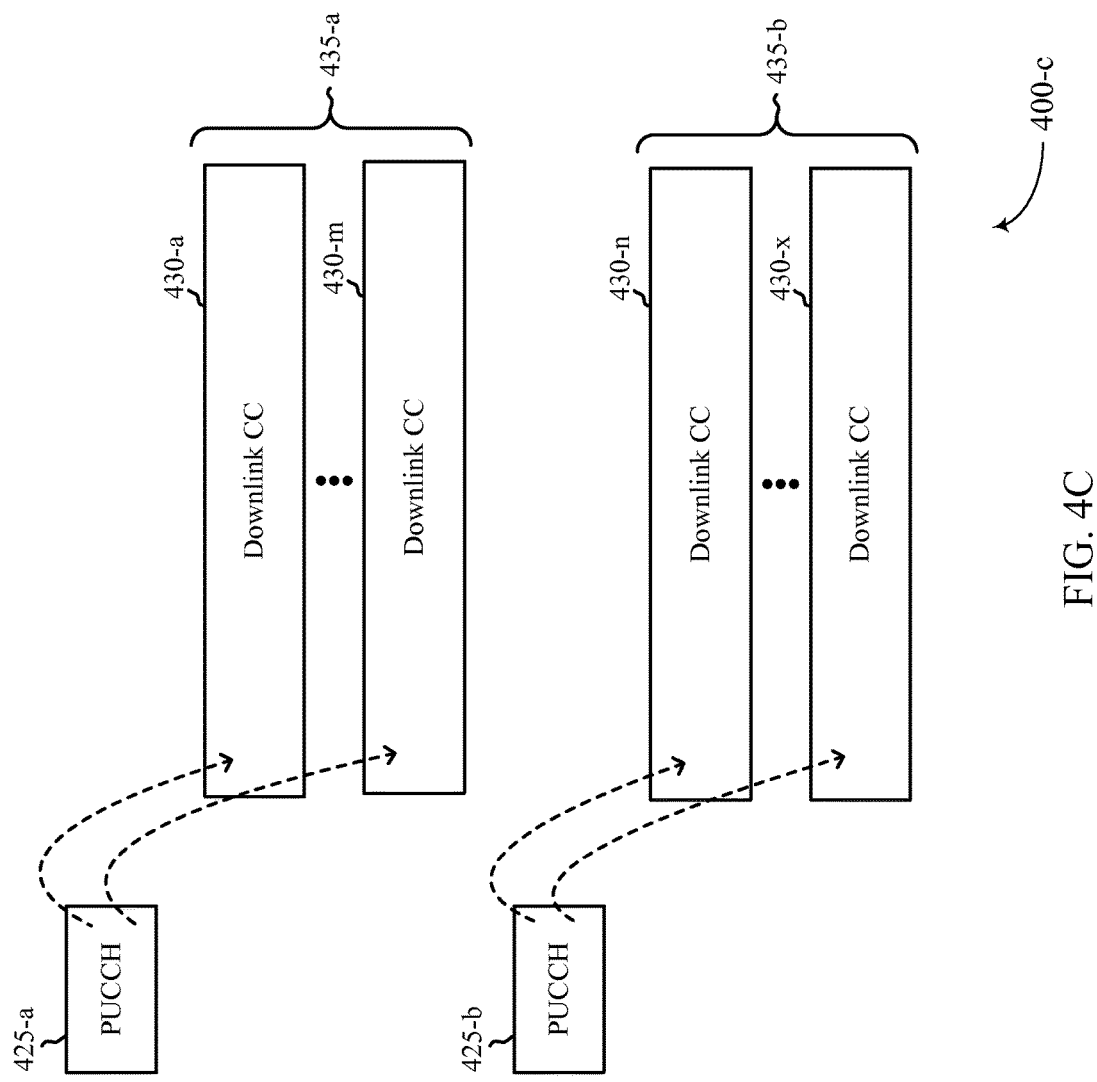
FIG. 4C illustrates another example of component carriers in a wireless communication system, in accordance with various aspects of the present disclosure.

FIG. 4C illustrates another example of CCs in a wireless communication system 400-c, in accordance with various aspects of the present disclosure. The wireless communication system 400-c may be an example of various aspects of the wireless communication system 100, 200-b or 300 of FIGS. 1, 2B, and 3. A first uplink CC 425-a may be configured with a first PUCCH. A second uplink CC 425-b may be configured with a second PUCCH. In some examples, the first uplink CC 425-a and the second uplink CC 425-b may be configured with two or more parallel PUCCHs. The parallel PUCCHs may be parallel in time or frequency. The first PUCCH of the first uplink CC 425-a may be associated with a first group of CCs 435-a. The first PUCCH of the first uplink CC 425-a may thus provide feedback for the first group of CCs 435-a. The first group of CCs 435-a may include M downlink CCs 430-a through 430-m, where M is at least one. The second PUCCH of the second uplink CC 425-b may be associated with a second group of CCs 435-b. The second PUCCH of the second uplink CC 425-b may thus provide feedback for the second group of CCs 435-b. The second group of CCs 435-b may include X downlink CCs 430-n through 430-x, where X is at least one. In some examples, the total of M and X may be more than five, resulting in the two PUCCHs being associated with more than five downlink CCs.

As shown in FIGS. 2B, 3, and 4C, two uplink CCs may be configured with PUCCHs. In some examples, this may be referred to as dual-connectivity or dual-PUCCH carrier aggregation. By using two PUCCHs on two uplink CCs, 10 downlink CCs may be aggregated for a UE without modifying the PUCCHs. Each PUCCH group (e.g., a PCell PUCCH and a SCell PUCCH) may support up to five downlink CCs using a carrier aggregation configuration. However, if one of the PUCCHs needs to support more than five downlink CCs, the PUCCH may be modified as described above. For example, eight downlink CCs may be associated with the primary PUCCH and two downlink CCs may be associated with the secondary PUCCH.

In some examples, enabling parallel PUCCHs on the same uplink CC may be preferable over configuring two PUCCHs on two different uplink CCs because some UEs may be capable of only one uplink CC or because doing so may require less power. For example, a UE 115 (FIGS. 1 and 2) may be configured with a single uplink CC, which may require less power than configuring multiple uplink CCs.

Configuring multiple PUCCHs on a single CC may also provide for ready implementation in systems supporting legacy (e.g., Release 11 and earlier) UEs 115. For example, the determination of resources for the second PUCCH may be a function of the resources determined for the first PUCCH. For example, the resource for the second PUCCH may be the next resource after that of the first PUCCH. In this way, the two PUCCHs can be equivalently viewed as a single PUCCH occupying two resources. Alternatively, the first and second PUCCH resources may be separately determined on a per group basis (e.g., the first PUCCH resources are determined based on the first group of CCs, and the second PUCCH resources are determined based on the second group of CCs). In some examples, a UE 115 may identify the capability to support more than five downlink carriers or of supporting a dual PUCCH configuration and indicate the capability to a base station 105. For example, the UE 115 may indicate to the base station 105 the capability in an initial message of a random access request. Or the UE 115 may utilize other signaling to declare that it is of a particular category that supports carrier aggregation with more than five CCs or multiple PUCCHs, or both.

In some cases, when the two PUCCHs are located on a same uplink CC, separate coding and mapping may be performed for the two PUCCHs. Alternatively, joint coding or joint mapping may be performed. As an example, assume K1 is the payload size of the first PUCCH and K2 is the payload size of the second PUCCH, and assume Q1 is the number of available resource elements of the first PUCCH and Q2 is the number of available resource elements of the second PUCCH. Joint coding may be performed for K=K1+K2 bits. The coded bits, after other necessary processing (e.g., modulation), may then be mapped to the Q=Q1+Q2 resources.

In some cases, the two PUCCHs may have the same PUCCH formats. Alternatively, different PUCCH formats may be configured by the two PUCCHs. The PUCCH formats may include PUCCH formats 1, 1a, 1b, PUCCH formats 2, 2a, 2b, or PUCCH format 3. The PUCCH format used by each of the two PUCCH may also depend on the uplink control information (UCI) carried on the respective PUCCH.

In some cases, control channel handling may allow for additional CCs to be supported. In certain legacy wireless communication systems (e.g., systems implementing earlier versions of LTE), when more than five CCs are used in a multi-carrier configuration, a UE 115 (FIGS. 1 and 2) may need to monitor a larger number of control channels. This may result in undesirable consequences, such as a large control overhead, large UE complexity, and greater battery consumption. Joint control or multiple sub-frame control may allow a UE 115 to use more than five CCs in a multi-carrier configuration more efficiently. For example, joint control may involve one control channel scheduling two or more CCs. Multiple sub-frame control may involve one control channel scheduling two or more sub-frames.

Additionally or alternatively, a cross-carrier indicator field (CIF) may be used for cross-carrier scheduling. In some examples, the CIF may include three bits, which may support up to eight CCs. In some examples, the CIF may be increased to four bits, which may support more than eight CCs.

Other control and data channel design measures may also help support a large number of CCs. In some examples, PUCCH power control may be adjusted to reflect the larger ACK/NACK payload size for HARQ feedback. In some examples, the ACK/NACK payload for HARQ feedback may be configured on a physical uplink shared channel (PUSCH). If a single PUSCH is used to carry ACK/NAK, the ACK/NAK payload associated with the first PUCCH and the ACK/NAK payload associated with the second PUCCH may be jointly coded and mapped on the PUSCH. If there are two PUSCHs to carry ACK/NAK, the ACK/NAK payload for each of the PUCCH may be separately coded and mapped to one of the PUSCH. In case of joint ACK/NAK on a PUSCH, the ACK/NACK payload for HARQ feedback may be configured on the PUSCH to use a larger offset size.

In some examples, aperiodic channel state information (CSI) triggering may trigger CSI feedback for more than five CCs in one sub-frame. The aperiodic CSI triggering may be adjusted based on a number of resources of the CCs. In some cases, a condition for determining whether uplink data (UL-SCH) is present on a PUSCH or not when aperiodic CSI is triggered may be determined based on a maximum total number of CCs configured for a UE. As an example, if up to 10 CCs are supported, the condition may be defined as if the modulation and coding scheme (MCS) index is 29, the aperiodic CSI triggering is set, and the number of assigned resource blocks (RBs) is 40 or less. As another example, if up to 10 CCs are supported, the condition may be defined as if the MCS index is 29, the aperiodic CSI triggering is set, and the number of assigned RBs is 20 or less. Alternatively, the condition for determining whether uplink data (UL-SCH) is present on a PUSCH or not when aperiodic CSI is triggered may be determined separately for each PUSCH based on a maximum total number of CCs configured within a PUCCH group for a UE, if two PUSCHs are used to carry aperiodic CSI. In some examples, an uplink control information (UCI) transmission may be determined based at least in part on CSI report scheduling on the first PUCCH and the second PUCCH.

Figure 5:
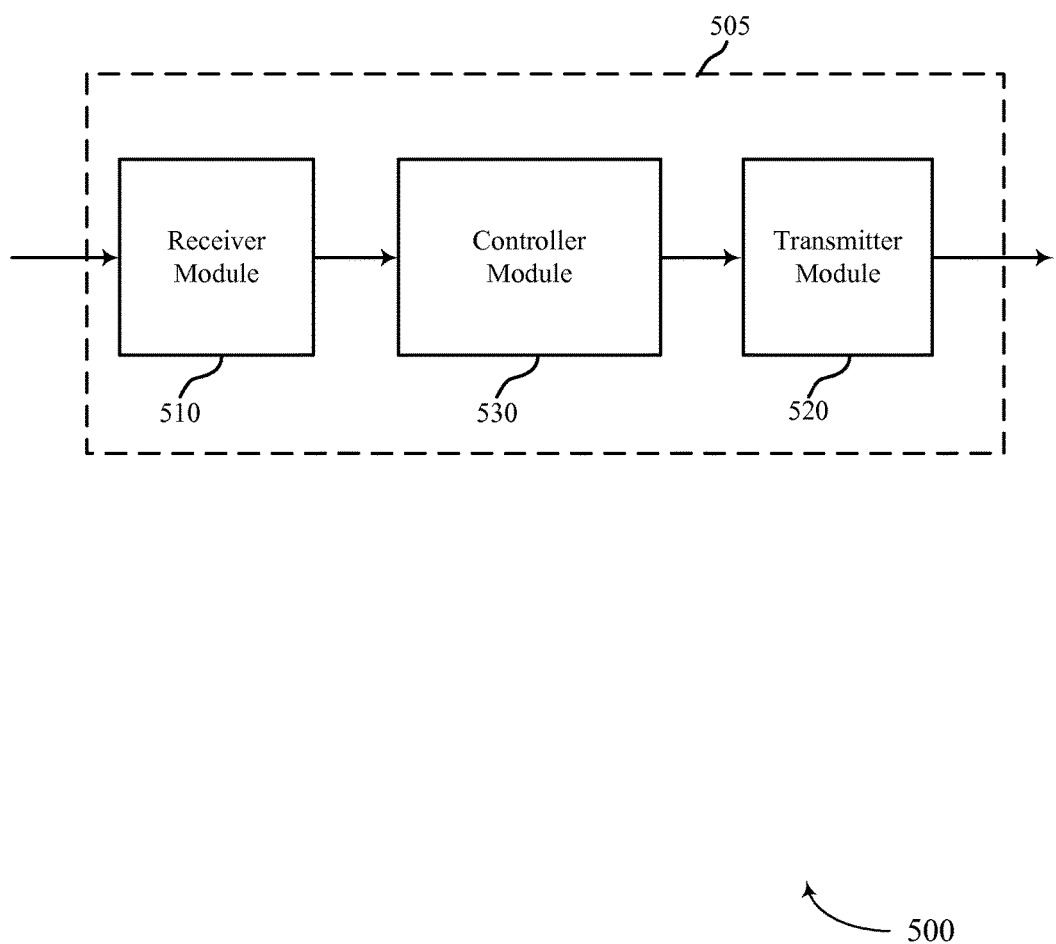
FIG. 5 shows a block diagram of an apparatus for use in wireless communication, in accordance with various aspects of the present disclosure.

FIG. 5 shows a block diagram 500 of an apparatus 505 for use in wireless communication, in accordance with various aspects of the present disclosure. In some examples, the apparatus 505 may be an example of aspects of one or more UEs 115 described with reference to FIGS. 1, 2A, 2B, or 3. The apparatus 505 may also be a processor. The apparatus 505 may include a receiver module 510, a controller module 530, or a transmitter module 520. Each of these components may be in communication with one another.

The receiver module 510 may include a radio frequency (RF) receiver operable to receive transmissions over a licensed radio frequency spectrum band—e.g., a radio frequency spectrum band for which apparatuses do not contend for access because the radio frequency spectrum band is licensed to particular users (e.g., LTE/LTE-A users) for particular uses. And the receiver module 510 may be configured to receive transmission over an unlicensed radio frequency spectrum band—e.g., a radio frequency spectrum band for which apparatuses may need to contend for access because the radio frequency spectrum band is available. Such unlicensed spectrum may include communications utilizing Wi-Fi or LTE/LTE-A in an unlicensed radio frequency spectrum. In some examples, the licensed radio frequency spectrum band or the unlicensed radio frequency spectrum band may include component carriers, as described with reference to FIGS. 1-4. The receiver module 510 may be used to receive various types of data or control signals over one or more communication links of a wireless communication system, such as one or more CCs of the wireless communication system 100, 200-a, 200-b, or 300 described with reference to FIGS. 1, 2A, 2B, or 3. The communication links may be established over the licensed radio frequency spectrum band or the unlicensed radio frequency spectrum band. In some examples, the receiver module 510 may be configured to receive downlink CCs including a carrier segment.

The transmitter module 520 may include an RF transmitter operable to transmit over the licensed radio frequency spectrum band or the unlicensed radio frequency spectrum band. The transmitter module 520 may be used to transmit various types of data or control signals over one or more communication links of a wireless communication system, including one or more CCs of the wireless communication system 100, 200-a, 200-b, or 300 described with reference to FIGS. 1, 2A, 2B, or 3. The communication links may be established over the licensed radio frequency spectrum band or the unlicensed radio frequency spectrum band.

In some examples, the controller module 530 may be configured to identify and/or indicate a capability of the apparatus 505 to support more than five downlink component carriers or a dual PUCCH configuration. The controller module 530 may be configured to receive a multi-carrier configuration that includes a first group of CCs and a second group of CCs. The first group of CCs and the second group of CCs may each include one or more downlink CCs. The first group of CCs and the second group of CCs may each include at least one of a time-division duplexing (TDD) carrier, a frequency-division duplexing (FDD) carrier, or a combination of TDD carriers and FDD carriers.

In some examples, the controller module 530 may be configured to generate a first physical uplink control channel (PUCCH) associated with at least one downlink CC of the first group of CCs. The controller module 530 may also be configured to generate a second PUCCH associated with at least one downlink CC of the second group of CCs. For instance, the controller module 530 may generate uplink control information to transmit on the respective PUCCHs. The controller module 530 may thus be configured to cause the apparatus 505 to transmit the first PUCCH, the second PUCCH, or a combination of the first PUCCH and the second PUCCH, which may be configured on the same or different CCs.

Figure 6:
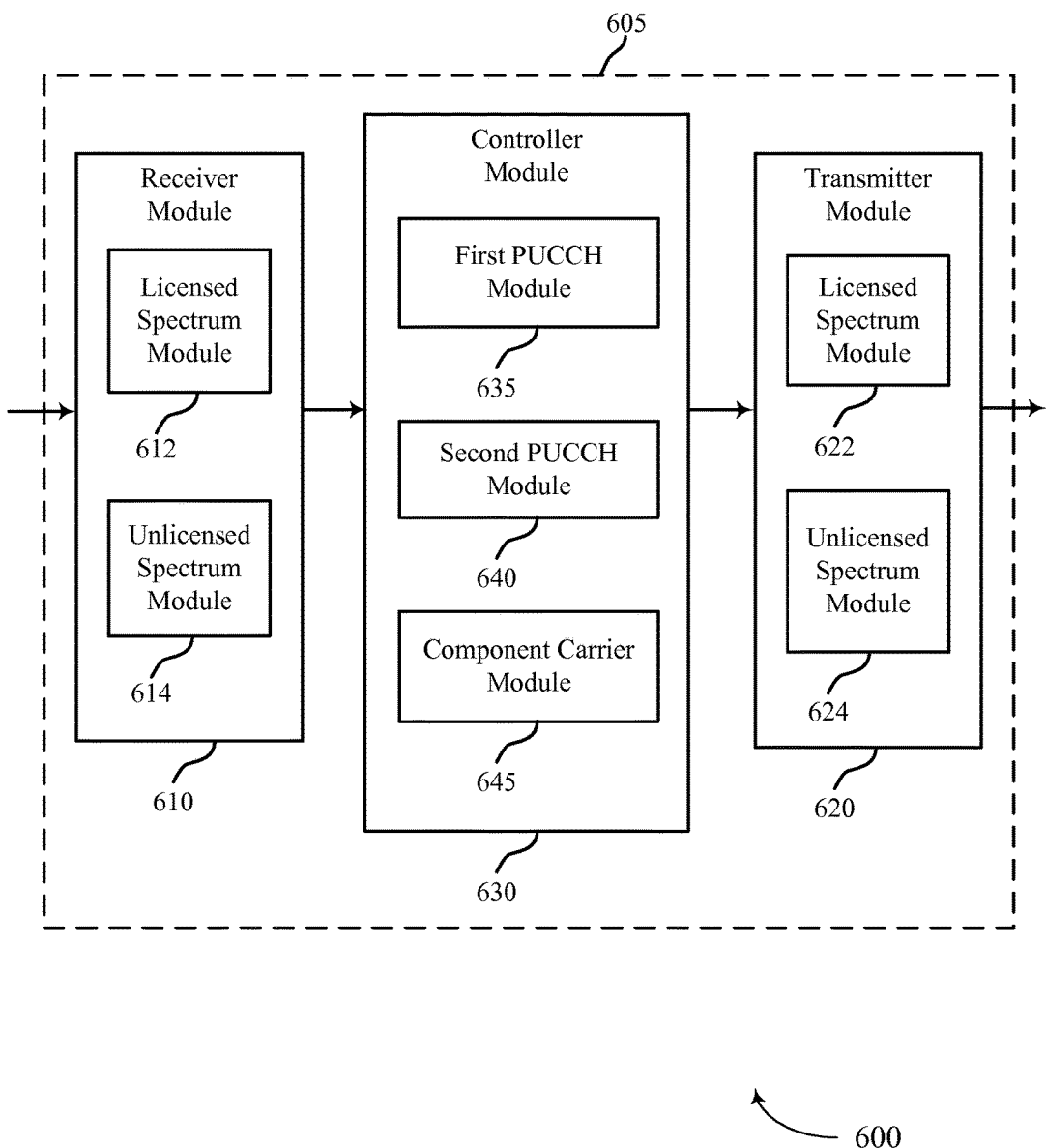
FIG. 6 shows a block diagram of another apparatus for use in wireless communication, in accordance with various aspects of the present disclosure.

FIG. 6 shows a block diagram 600 of an apparatus 605 for use in wireless communication, in accordance with various aspects of the present disclosure. The apparatus 605 may be an example of aspects of one or more of the UEs 115 described with reference to FIGS. 1, 2A, 2B, or 3, or an example of aspects of the apparatus 505 described with reference to FIG. 5. The apparatus 605 may also be a processor. The apparatus 605 may include a receiver module 610, a controller module 630, or a transmitter module 620. Each of these components may be in communication with one another.

In some examples, the receiver module 610 is an example of the receiver module 510 described with reference to FIG. 5. The receiver module 610 may, in some cases, include a licensed spectrum module 612 and an unlicensed spectrum module 614 for receiving communications via licensed radio frequency spectrum band and the unlicensed radio frequency spectrum band, respectively. The receiver module 610 may be configured to receive a multi-carrier configuration, which may include a first group of component carriers and a second group of component carriers, which may each include one or several downlink component carriers.

In some examples, the transmitter module 620 may be an example of one or more aspects of the transmitter module 520 described with reference to FIG. 5. The transmitter module 620 may include licensed spectrum module 622 and an unlicensed spectrum module 624 operable to transmit over the licensed radio frequency spectrum band or the unlicensed radio frequency spectrum band, respectively.

In some examples, the controller module 630 may be an example of one or more aspects of the controller module 530 described with reference to FIG. 5. The controller module 630 may include a first PUCCH module 635, a second PUCCH module 640, and a component carrier module 645. In some examples, the component carrier module 645 may be configured to indicate a capability of the apparatus 605 to support more than five downlink component carriers. The first PUCCH module 635 may, in conjunction with the transmitter module 620, be configured to transmit a first physical uplink control channel (PUCCH) associated downlink CCs of a first group of CCs. And the second PUCCH module 640 may, in conjunction with the transmitter module 620, be configured to transmit a second PUCCH associated with downlink CCs of a second group of CCs. In some examples, the first PUCCH module 635 may be configured to determine a resource for the first PUCCH based at least in part on information within the first group of CCs. The second PUCCH module 640 may be configured to determine a resource for the second PUCCH based at least in part on information within the second group of CCs.

The component carrier module 645 may then be configured to cause the apparatus 605 to transmit the first PUCCH, the second PUCCH, or a combination of the first PUCCH and the second PUCCH. In some examples, the component carrier module 645 may be configured to, in combination with the transmitter module 620, transmit the first PUCCH and the second PUCCH on a common uplink CC. Alternatively, the component carrier module 645 may be configured to cause the first PUCCH to be transmitted on a first uplink CC, and the second PUCCH to be transmitted on a second uplink CC. In some examples, the first uplink CC may correspond to a primary cell group, and the second uplink CC correspond to a secondary cell group. In some examples, the primary cell group and the secondary cell group may be associated with a single base station. Alternatively, the primary cell group may be associated with a first base station, and the secondary cell group may be associated with a second base station. The first base station and the second base station may be in communication via a non-ideal backhaul link.

Figure 7:
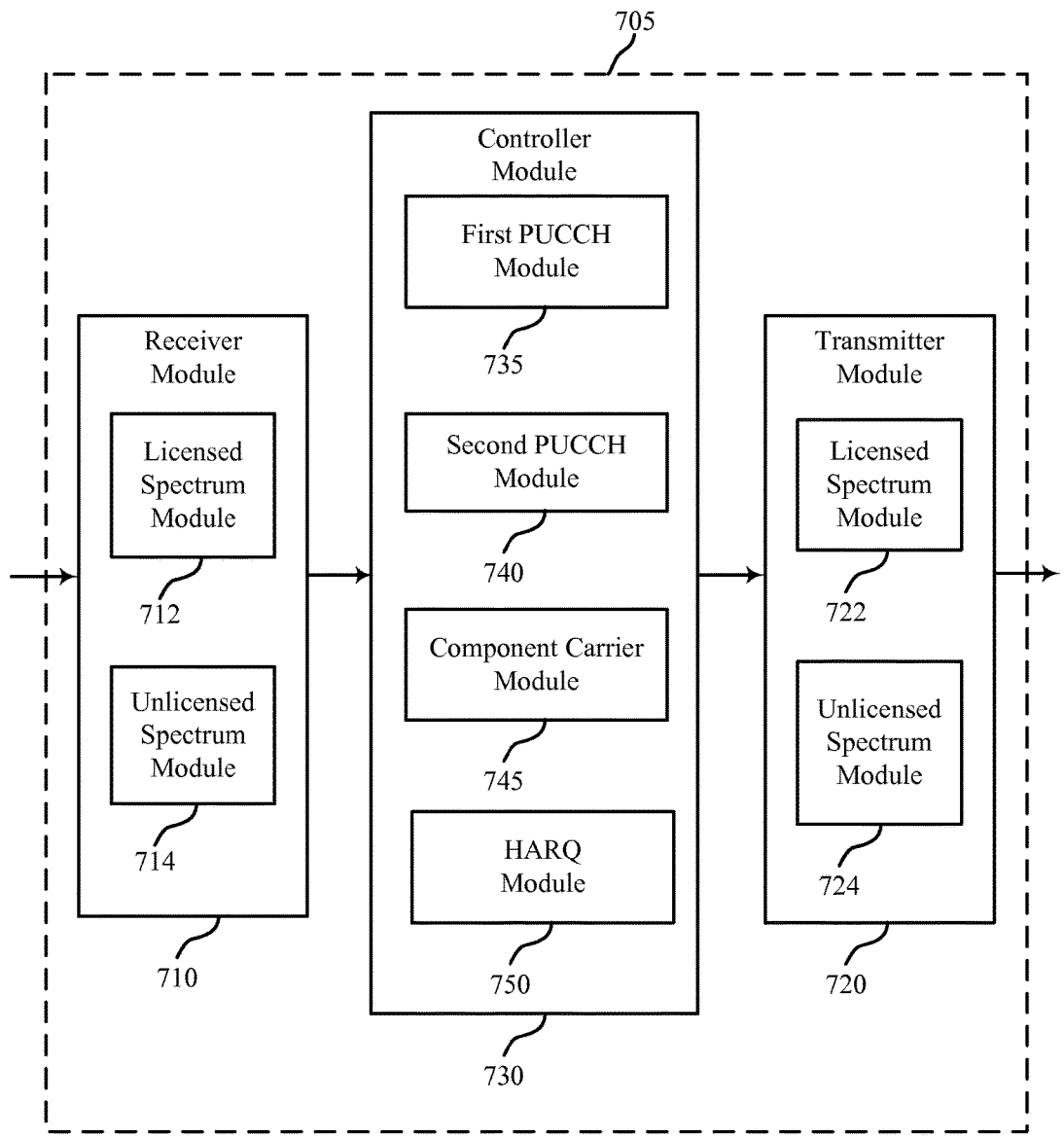
FIG. 7 shows a block diagram of another apparatus for use in wireless communication, in accordance with various aspects of the present disclosure.

FIG. 7 shows a block diagram 700 of an apparatus 705 for use in wireless communication, in accordance with various aspects of the present disclosure. In some examples, the apparatus 705 may be an example of aspects of one or more UEs 115 described with reference to FIGS. 1, 2A, 2B, or 3. The apparatus 705 may also be an example the apparatuses 505 or 605 described with reference to FIGS. 5 and 6. The apparatus 705 may also be a processor. The apparatus 705 may include a receiver module 710, a controller module 730, or a transmitter module 720. Each of these components may be in communication with one another.

The receiver module 710 may be an example of one or more aspects of the receiver module 510 or 610 described with reference to FIGS. 5 and 6; and the licensed spectrum module 712 and the unlicensed spectrum module 714 may, respectively, be examples of the licensed spectrum module 612 and the unlicensed spectrum module 614 of FIG. 6. In some examples, the transmitter module 720 is an example of the transmitter module 520 or 620 described with reference to FIGS. 5 and 6; and the licensed spectrum module 722 and the unlicensed spectrum module 724 may, respectively, be examples of the licensed spectrum module 622 and the unlicensed spectrum module 624 of FIG. 6.

In some examples, the controller module 730 is an example of the controller module 530 or 630 described with reference to FIGS. 5 and 6. The controller module 730 may include a first PUCCH module 735, a second PUCCH module 740, a component carrier module 745, and a HARQ module 750. The first PUCCH module 735, the second PUCCH module 740, and the component carrier module 745 may be examples of one or more aspects of the first PUCCH module 635, the second PUCCH module 640, and the component carrier module 645, respectively, described with reference to FIG. 6.

In some examples, the HARQ module 750 is configured to determine a first HARQ payload size for a first PUCCH and a second HARQ payload size for a second PUCCH. The total HARQ payload size of the first HARQ payload size and the second HARQ payload size may exceed a threshold (e.g., 20 bits). The HARQ module 750 may be configured to determine a first power control value for the first PUCCH based on the HARQ payload size for the downlink CCs of the first group of CCs. And the HARQ module 750 may be configured to determine a second power control value for the second PUCCH based on a HARQ payload size for the downlink CCs of the second group of CCs.

Figure 8:
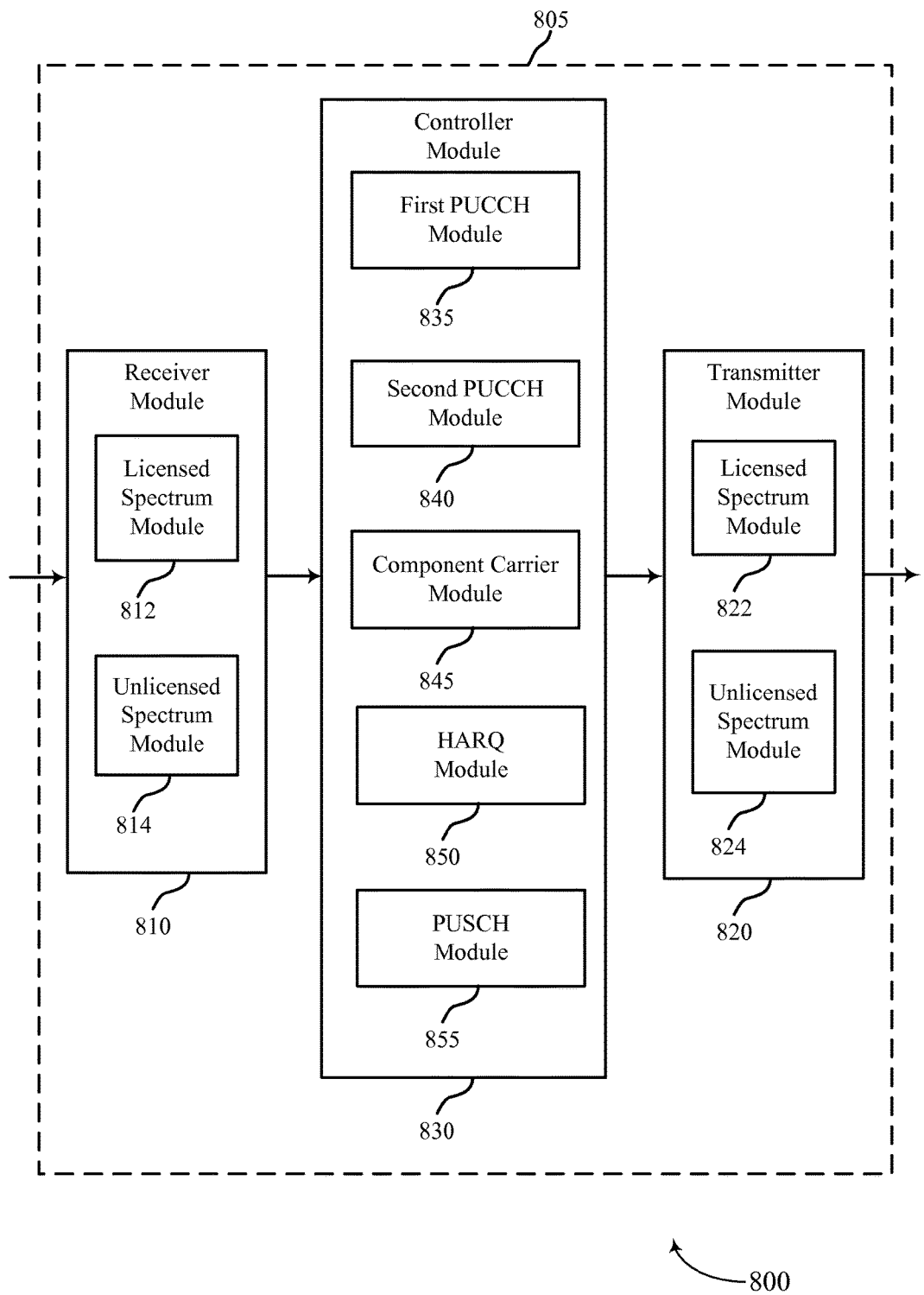
FIG. 8 shows a block diagram of another apparatus for use in wireless communication, in accordance with various aspects of the present disclosure.

FIG. 8 shows a block diagram 800 of an apparatus 805 for use in wireless communication, in accordance with various aspects of the present disclosure. In some examples, the apparatus 805 may be an example of aspects of one or more UEs 115 described with reference to FIGS. 1, 2A, 2B, or 3. The apparatus 805 may also be an example the apparatuses 505, 605, or 705 described with reference to FIGS. 5-7. The apparatus 805 may also be a processor. The apparatus 805 may include a receiver module 810, a controller module 830, or a transmitter module 820. Each of these components may be in communication with one another.

In some examples, the receiver module 810 may be an example of one or more aspects of the receiver module 510, 610, or 710 described with reference to FIGS. 5, 6, and 7; and the licensed spectrum module 812 and the unlicensed spectrum module 814 may, respectively, be examples of the licensed spectrum modules 612 and 712 and the unlicensed spectrum modules 614 and 714 of FIGS. 6 and 7. The transmitter module 820 may be an example of one or more aspects of the transmitter module 520, 620, or 720 described with reference to FIGS. 5, 6, and 7; and the licensed spectrum module 822 and the unlicensed spectrum module 824 may, respectively, be examples of the licensed spectrum modules 622 and 722 and the unlicensed spectrum modules 624 and 724 of FIGS. 6 and 7.

In some examples, the controller module 830 may be an example of one or more aspects of the controller module 530, 630, or 730 described with reference to FIGS. 5, 6, and 7. The controller module 830 may include a first PUCCH module 835, a second PUCCH module 840, a component carrier module 845, a HARQ module 850, and a PUSCH module 855. The first PUCCH module 835, the second PUCCH module 840, and the component carrier module 845 may be examples of one or more aspects of the first PUCCH module 635, the second PUCCH module 640, and the component carrier module 645, respectively, described with reference to FIG. 6, or the first PUCCH module 735, the second PUCCH module 740, and the component carrier module 745, respectively, described with reference to FIG. 7. The HARQ module 850 may be an example of one or more aspects of the HARQ module 750 described with reference to FIG. 7.

In some examples, the PUSCH module 855 is configured to adjust a PUSCH offset based on at least one of a HARQ payload size for the downlink CCs of the first group, a HARQ payload size for the downlink CCs of the second group, or a HARQ payload size of the downlink CCs of both groups. The HARQ payload size may be determined by the HARQ module 850. In some examples, the PUSCH module 855 is configured to trigger aperiodic channel state information (CSI) reporting based on a number of CCs of the first group of CCs, a number of CCs of the second group of CCs, or a number of CCs of both the first and the second groups of CCs. In some examples, the PUSCH module 855 is configured to generate an uplink control information (UCI) transmission based at least in part on CSI report scheduling on the first PUCCH and the second PUCCH.

The components of each of the apparatuses 505, 605, 705, or 805 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

Figure 9:
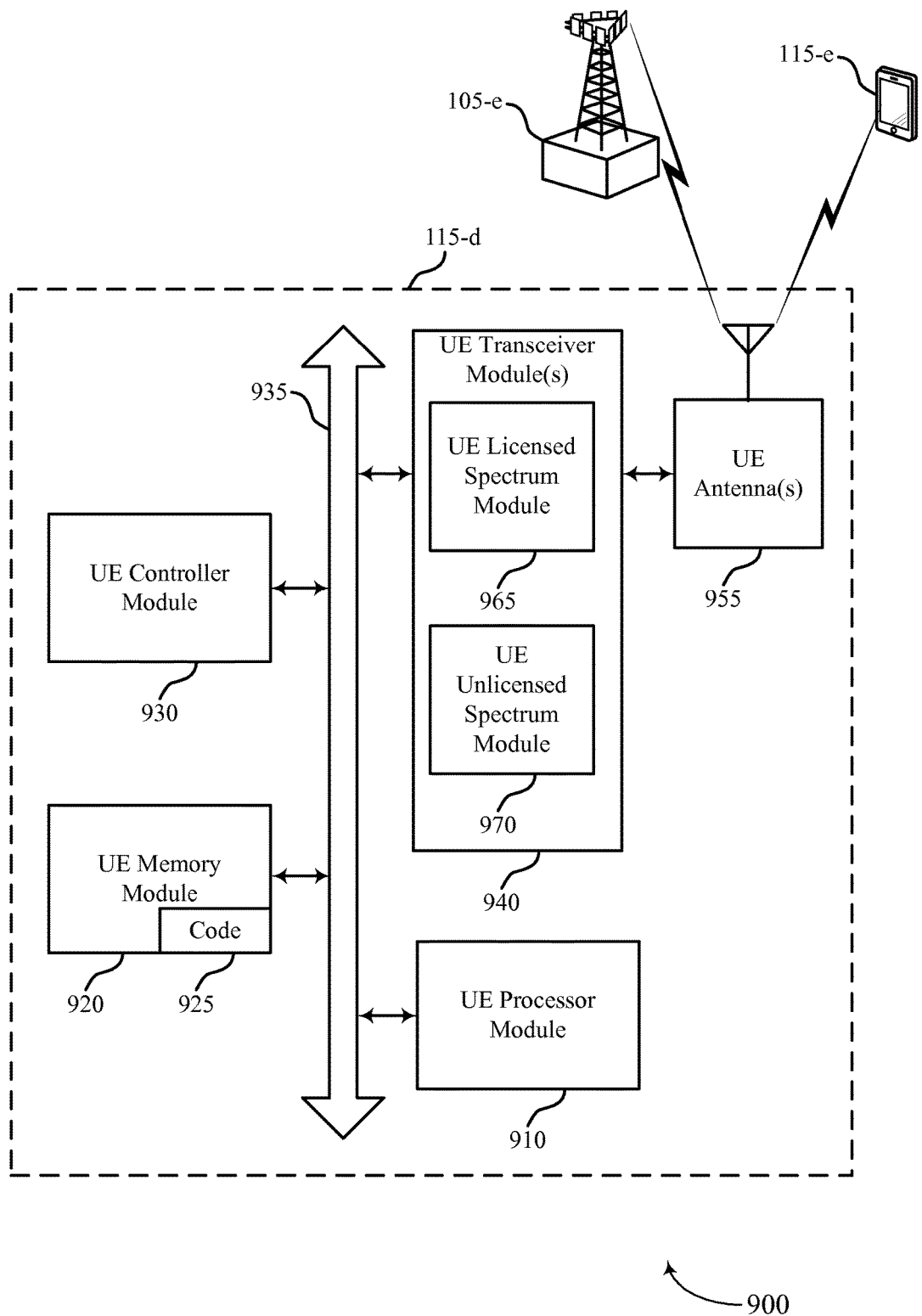
FIG. 9 shows a block diagram of a system for wireless communication, in accordance with various aspects of the present disclosure.

FIG. 9 shows a block diagram of a system 900, including a UE 115-d, for use in wireless communication, in accordance with various aspects of the present disclosure. The UE 115-d may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 115-d may, in some examples, have an internal power supply (not shown), such as a small battery, to facilitate mobile operation. In some examples, the UE 115-d may be an example of one or more aspects of the UEs 115 described with reference to FIGS. 1, 2A, 2B, or 3, or one or more aspects of the apparatuses 505, 605, 705, or 805 described with reference to FIGS. 5, 6, 7, and 8. The UE 115-d may be configured to implement at least some of the UE or apparatus features and functions described with reference to FIGS. 1-8.

The UE 115-d may include a UE processor module 910, a UE memory module 920, UE transceiver module(s) 940, UE antenna(s) 955, or a UE controller module 930. Each of these components may be in communication with each other, directly or indirectly, over one or more buses 935.

The UE memory module 920 may include RAM or ROM. The UE memory module 920 may store computer-readable, computer-executable code 925 (e.g., software or firmware) containing instructions that are configured to, when executed, cause the UE processor module 910 to perform various functions described herein related to wireless communication. Alternatively, the computer-executable code 925 may not be directly executable by the UE processor module 910 but be configured to cause the UE 115-d (e.g., when compiled and executed) to perform various functions described herein.

The UE processor module 910 may include an intelligent hardware device, e.g., a CPU, a microcontroller, an ASIC, etc. The UE processor module 910 may process information received through the UE transceiver module(s) 940 or information to be sent to the UE transceiver module(s) 940 for transmission through the UE antenna(s) 955. The UE processor module 910 may handle, alone or in connection with the UE controller module 930 and the UE transceiver module(s) 940, various aspects of communicating over (or managing communications over) a licensed radio frequency spectrum band or an unlicensed radio frequency spectrum band.

The UE transceiver module(s) 940 may include a modem configured to modulate packets and provide the modulated packets to the UE antenna(s) 955 for transmission, and to demodulate packets received from the UE antenna(s) 955. The UE transceiver module(s) 940 may, in some examples, be implemented as one or more UE transmitter modules and one or more separate UE receiver modules. The UE transceiver module(s) 940 may support communications in the licensed radio frequency spectrum band or the unlicensed radio frequency spectrum band. The UE transceiver module(s) 940 may be configured to communicate bi-directionally, via the UE antenna(s) 955, with one or more of the base stations 105 (e.g., base station 105-*e*) and UEs 115 (e.g., UE 115-*e*) as described with reference to FIGS. 1, 2A, 2B, or 3. While the UE 115-*d* may include a single UE antenna, there may be examples in which the UE 115-*d* may include multiple UE antennas 955.

The UE controller module 930 may be configured to perform or control some or all of the features or functions described with reference to FIGS. 1-8 related to wireless communication (e.g., functions relating to communicating with more than five component carriers, etc.). For example, the UE controller module 930 may be configured to support more than five component carriers using the licensed radio frequency spectrum band or the unlicensed radio frequency spectrum band. The UE transceiver module(s) 940 may include a UE licensed spectrum module 965 configured to handle LTE/LTE-A communications in the licensed radio frequency spectrum band, and a UE unlicensed spectrum module 970 configured to handle LTE/LTE-A communications in the unlicensed radio frequency spectrum band. The UE controller module 930, or portions of it, may include a processor, or some or all of the functions of the UE controller module 930 may be performed by the UE processor module 910 or in connection with the UE processor module 910. In some examples, the UE controller module 930 may be an example of the controller module 530, 630, 730, or 830 described with reference to FIGS. 5, 6, 7, and 8.

Figure 10:
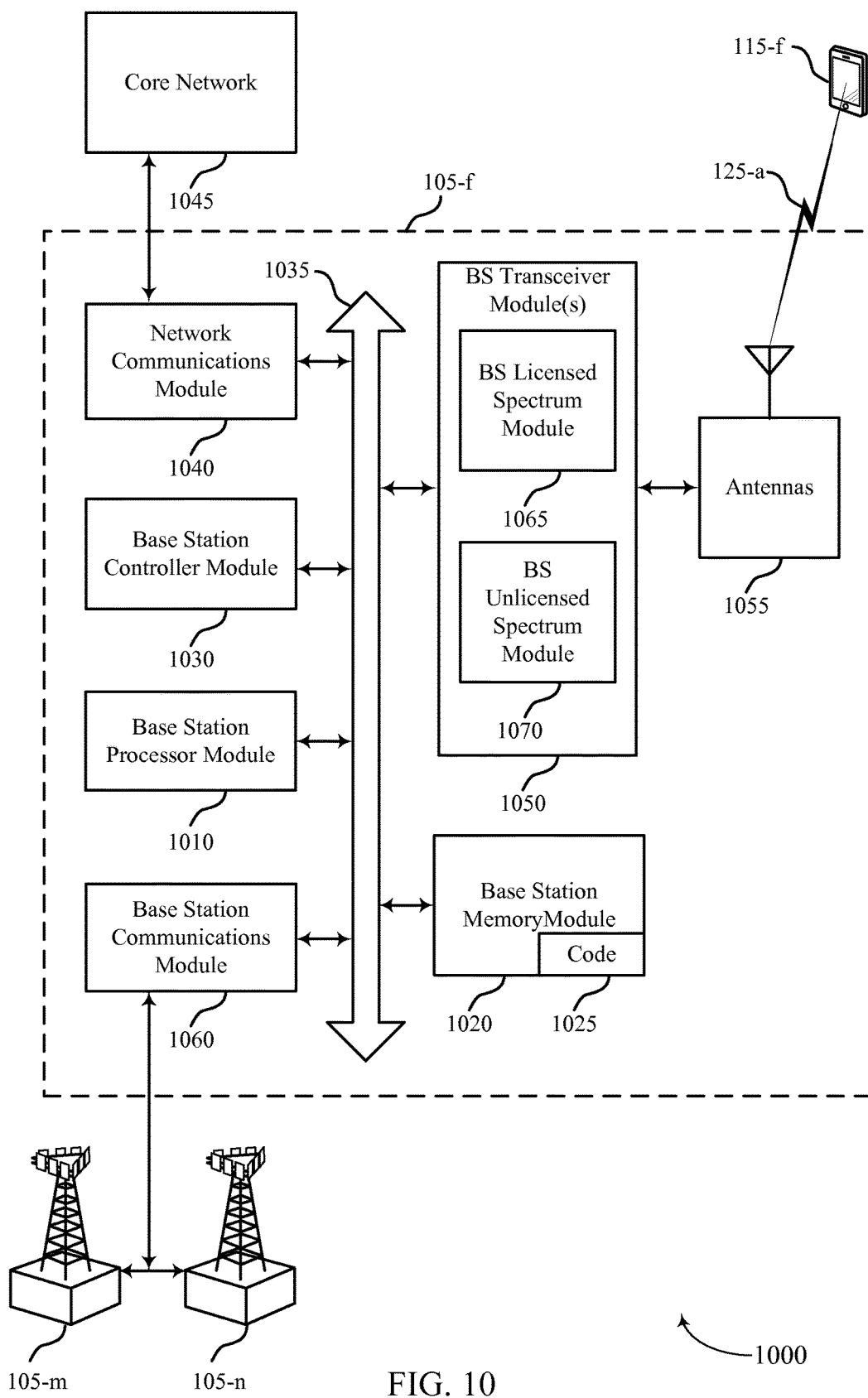
FIG. 10 shows a block diagram of a system for wireless communication, in accordance with various aspects of the present disclosure.

FIG. 10 shows a block diagram of system 1000, including a base station 105-*f* (e.g., a base station forming part or all of an eNB) for use in wireless communication, in accordance with various aspects of the present disclosure. In some examples, the base station 105-f may be an example of aspects of one or more of the base stations 105 described with reference to FIGS. 1, 2A, 2B, or 3. In some examples, the base station 105-*f* may implement some functions of the apparatuses 505, 605, 705, or 805, as described with reference to FIGS. 5, 6, 7, and 8. The base station 105-f may be configured to implement or facilitate at least some of the base station or apparatus features and functions described with reference to FIGS. 1-8.

The base station 105-f may include a base station processor module 1010, a base station memory module 1020, base station transceiver module(s) 1050, base station antenna(s) 1055, a base station communication module 1060, or a base station controller module 1030. The base station 105-*f* may also include a network communications module 1040. Each of these components may be in communication with one another, directly or indirectly, over one or more buses 1035.

The base station memory module 1020 may include random access memory (RAM) or read-only memory (ROM). The base station memory module 1020 may store computer-readable, computer-executable code 1025 (e.g., software or firmware) containing instructions that are configured to, when executed, cause the base station processor module 1010 to perform various functions described herein related to wireless communication (e.g., functions relating to enabling more than five component carriers, etc.). Alternatively, the computer-executable code 1025 may not be directly executable by the base station processor module 1010 but be configured to cause the base station 105-*f* (e.g., when compiled and executed) to perform various functions described herein.

The base station processor module 1010 may include an intelligent hardware device, e.g., a central processing unit (CPU), a microcontroller, an ASIC, etc. The base station processor module 1010 may process information received through the base station transceiver module(s) 1050 or the network communications module 1040. The base station processor module 1010 may also process information to be sent to the transceiver module(s) 1050 for transmission through the antenna(s) 1055, or to the network communications module 1040 for transmission to a core network 1045, which may be an example of one or more aspects of the core network 130 described with reference to FIG. 1. The base station processor module 1010 may handle, alone or in connection with the base station controller module 1030 and the base station transceiver module(s) 1050, various aspects of communicating over (or managing communications over) a wireless communication medium including a licensed radio frequency spectrum band or an unlicensed radio frequency spectrum band. In some examples, the base station processor module 1010 may identify a capability of supporting more than five downlink CCs and may configure CCs for a UE 115, which may include configuring CCs for dual-PUCCH operation.

The base station transceiver module(s) 1050 may include a modem configured to modulate packets and provide the modulated packets to the base station antenna(s) 1055 for transmission, and to demodulate packets received from the base station antenna(s) 1055. The base station transceiver module(s) 1050 may, in some examples, be implemented as one or more base station transmitter modules and one or more separate base station receiver modules. The base station transceiver module(s) 1050 may support communications in the licensed radio frequency spectrum band or the unlicensed radio frequency spectrum band. The base station transceiver module(s) 1050 may be configured to communicate bi-directionally, via the antenna(s) 1055, with a UE 115-*f*, which may be an example of a UE 115 described with reference to FIGS. 1, 2A, 2B, and 3, or one or more of the apparatuses 505, 605, 705, or 805 described with reference to FIGS. 5, 6, 7, and 8. The communication link 125-*a* may include more than five component carriers, in accordance with various aspects of the present disclosure. The base station 105-*f* may, for example, include multiple base station antennas 1055 (e.g., an antenna array). The base station 105-*f* may communicate with the core network 1045 through the network communications module 1040. The base station 105-*f* may also communicate with other base stations, such as base stations 105-*m* and 105-*n,* using base station communication module 1060.

The base station controller module 1030 may be configured to perform or control some or all of the features or functions described with reference to FIGS. 1-8 related to wireless communication (e.g., functions relating to enabling more than five component carriers for wireless communication, etc.). In some examples, the base station controller module 1030 may be configured to support more than five component carriers using the licensed radio frequency spectrum band or the unlicensed radio frequency spectrum band. The base station transceiver module(s) 1050 may include a base station licensed spectrum module 1065 configured to handle LTE/LTE-A communications in the licensed radio frequency spectrum band, and a base station unlicensed spectrum module 1070 configured to handle LTE/LTE-A communications in the unlicensed radio frequency spectrum band. The base station controller module 1030, or portions of it, may include a processor, or some or all of the functions of the base station controller module 1030 may be performed by the base station processor module 1010 or in connection with the base station processor module 1010. In some examples, the base station controller module 1030 may be an example of the controller module 530, 630, 730, or 830 described with reference to FIGS. 5, 6, 7, and 8.

Figure 11:
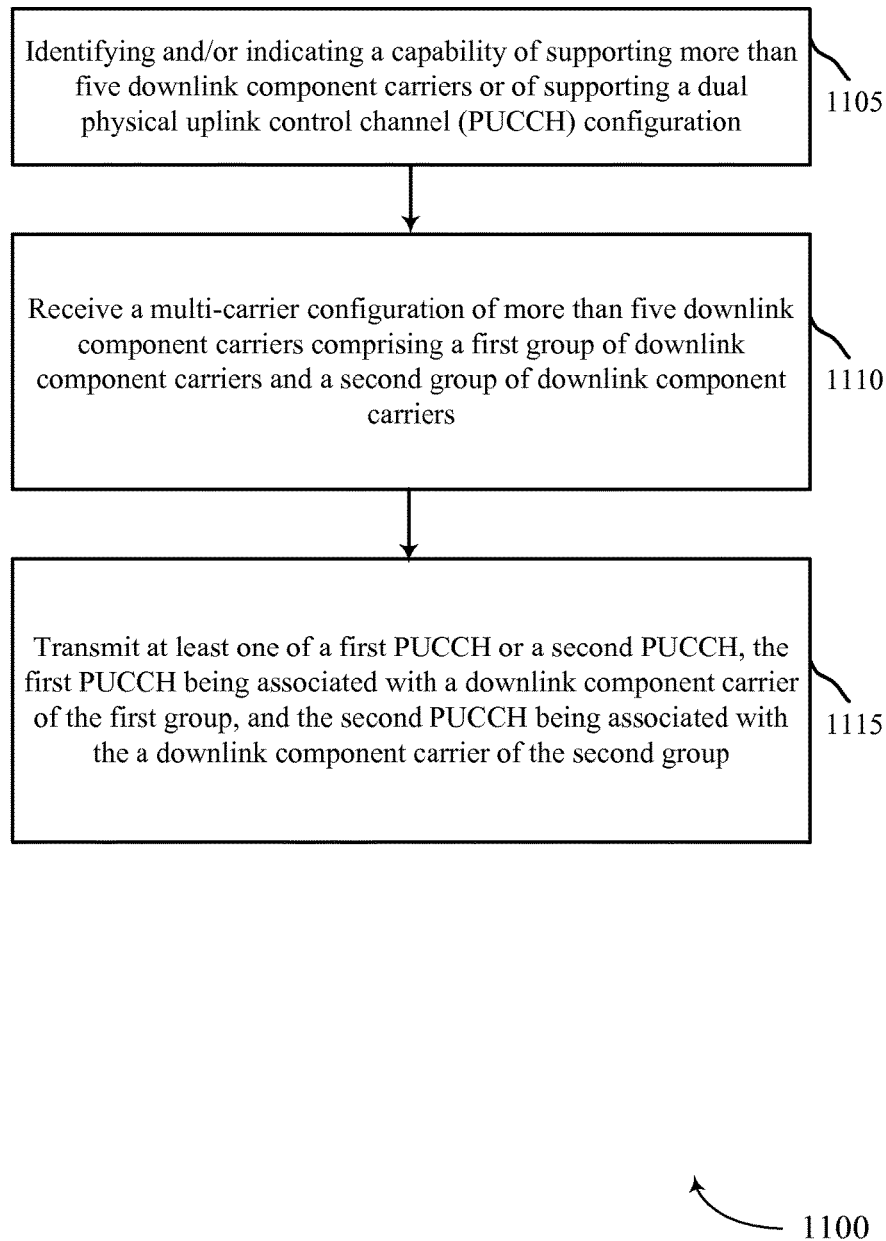
FIG. 11 is a flow chart illustrating an example of a method for wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to aspects of one or more of the base stations 105 or UEs 115 described with reference to FIGS. 1, 2A, 2B, and 3, or aspects of one or more of the apparatuses 505, 605, 705, or 805 described with reference to FIGS. 5, 6, 7, and 8. In some examples, a base station, UE, or apparatus may execute one or more sets of codes to control the functional elements of the base station, UE, or apparatus to perform the functions described below.

At block 1105, the method 1100 may include identifying and/or indicating a capability of supporting more than five downlink component carriers or of supporting a dual physical uplink control channel (PUCCH) configuration. At block 1110, the method 1100 may include receiving a multi-carrier configuration of more than five downlink component carriers comprising a first group of downlink component carriers and a second group of downlink component carriers. At block 1115, the method 1100 may include transmitting at least one of a first physical uplink control channel (PUCCH), a second PUCCH, or a combination of the first PUCCH and the second PUCCH, the first PUCCH being associated with a downlink component carrier of the first group, and the second PUCCH being associated with a downlink component carrier of the second group. It should be noted that the method 1100 is just one implementation and that the operations of the method 1100 may be rearranged or otherwise modified such that other implementations are possible.

Figure 12:
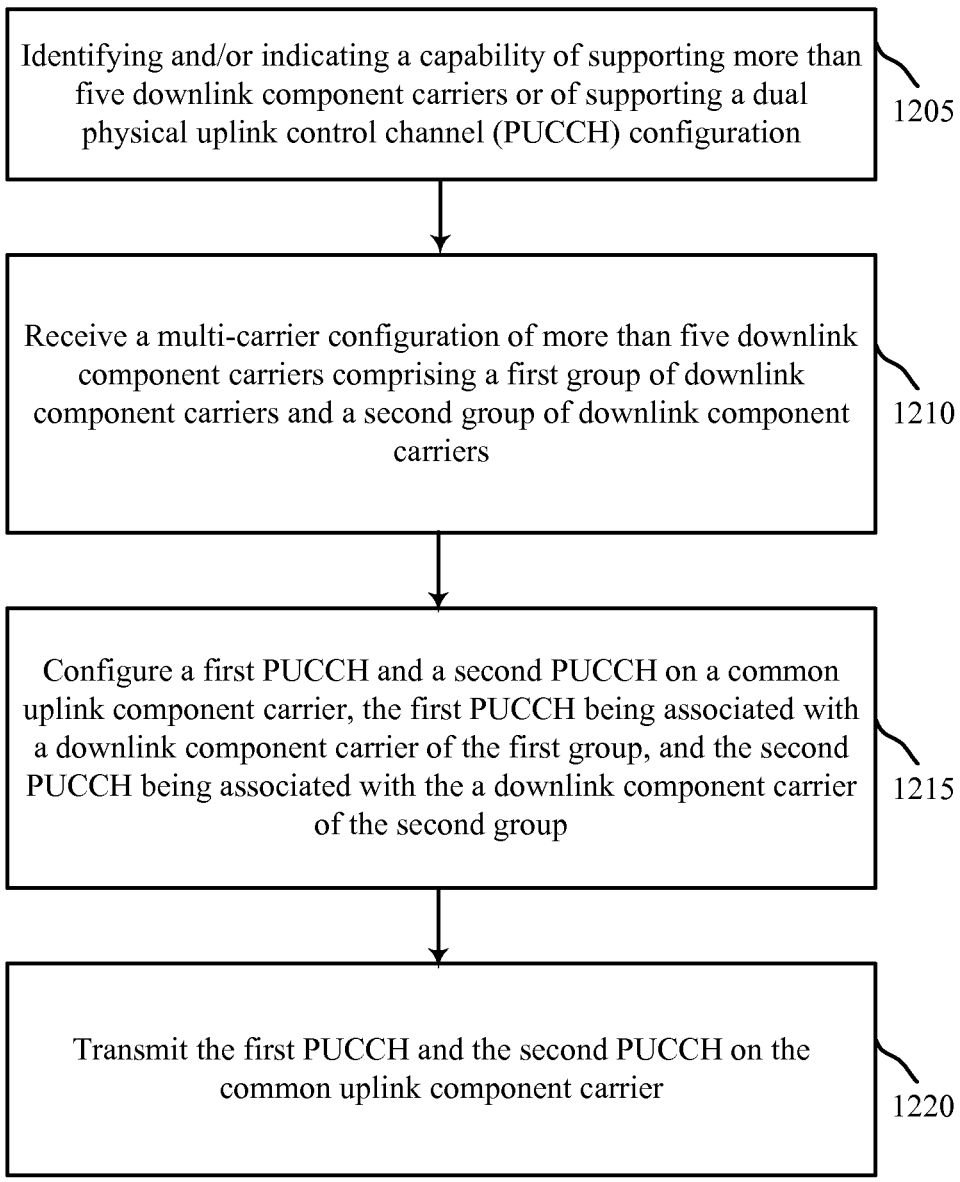
FIG. 12 is a flow chart illustrating another example of a method for wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of one or more of the base stations 105 or UEs 115 described with reference to FIGS. 1, 2A, 2B, and 3, or aspects of one or more of the apparatuses 505, 605, 705, or 805 described with reference to FIGS. 5, 6, 7, and 8. In some examples, a base station, UE, or apparatus may execute one or more sets of codes to control the functional elements of the base station, UE, or apparatus to perform the functions described below.

At block 1205, the method 1200 may include identifying and/or indicating a capability of supporting more than five downlink component carriers or of supporting a dual physical uplink control channel (PUCCH) configuration. At block 1210, the method 1200 may include receiving a multi-carrier configuration of more than five downlink component carriers comprising a first group of downlink component carriers and a second group of downlink component carriers. At block 1215, the method 1200 may include configuring a first physical uplink control channel (PUCCH) and a second PUCCH on a common uplink component carrier, the first PUCCH being associated with a downlink component carrier of the first group, and the second PUCCH being associated with the a downlink component carrier of the second group. At block 1220, the method 1200 may include transmitting the first PUCCH and the second PUCCH on the common uplink component carrier. It should be noted that the method 1200 is just one implementation and that the operations of the method 1200 may be rearranged or otherwise modified such that other implementations are possible.

Figure 13:
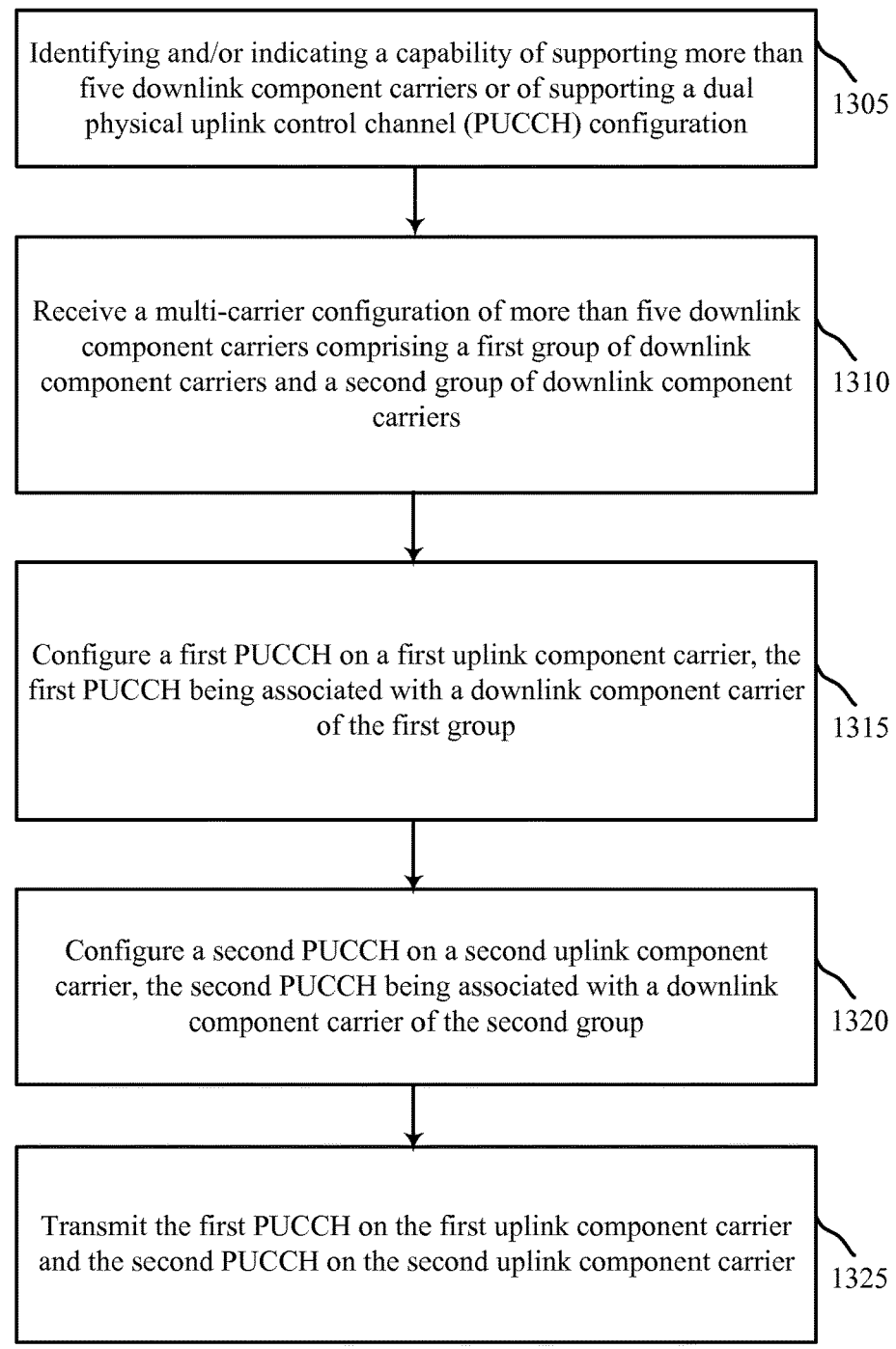
FIG. 13 is a flow chart illustrating yet another example of a method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of one or more of the base stations 105 or UEs 115 described with reference to FIGS. 1, 2A, 2B, and 3, or aspects of one or more of the apparatuses 505, 605, 705, or 805 described with reference to FIGS. 5, 6, 7, and 8. In some examples, a base station, UE, or apparatus may execute one or more sets of codes to control the functional elements of the base station, UE, or apparatus to perform the functions described below.

At block 1305, the method 1300 may include identifying and/or indicating a capability of supporting more than five downlink component carriers or of supporting a dual physical uplink control channel (PUCCH) configuration. At block 1310, the method 1300 may include receiving a multi-carrier configuration of more than five component carriers comprising a first group of downlink component carriers and a second group of downlink component carriers. At block 1315, the method 1300 may include configuring a first physical uplink control channel (PUCCH) on a first uplink component carrier, the first PUCCH being associated with the a component carrier of the first group. At block 1320, the method 1300 may include configuring a second PUCCH on a second uplink component carrier, the second PUCCH being associated with the a downlink component carrier of the second group. At block 1325, the method 1300 may include transmitting the first PUCCH on the first uplink component carrier and the second PUCCH on the second uplink component carrier. It should be noted that the method 1300 is just one implementation and that the operations of the method 1300 may be rearranged or otherwise modified such that other implementations are possible.

The detailed description set forth above in connection with the appended drawings describes example embodiments and does not represent the only embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another, including non-transitory media. A non-transitory storage medium may be any available medium that can be accessed by a general purpose or special purpose computer. By way of example, and not limitation, non-transitory computer-readable media can comprise RAM, ROM, EEPROM, CD-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein, but is to be accorded the widest scope consistent with the principles and novel features disclosed herein.

What is claimed is:

1. A method for wireless communication, comprising:

indicating a capability of supporting a dual physical uplink control channel (PUCCH) configuration;

receiving a multi-carrier configuration of downlink component carriers comprising a first group of downlink component carriers and a second group of downlink component carriers, wherein the first group of downlink component carriers and the second group of downlink component carriers together total more than five downlink component carriers;

determining, for a first PUCCH, a first hybrid automatic repeat request (HARQ) payload size of a first HARQ payload corresponding to the first group of downlink component carriers, wherein the first HARQ payload comprises HARQ feedback bundled from the first group of downlink component carriers;

adjusting a first power control value for the first PUCCH associated with the first group of downlink component carriers based at least in part on the determined first HARQ payload size;

determining, for a second PUCCH, that a second HARQ payload size of a second HARQ payload corresponding to the second group of downlink component carriers exceeds a threshold, wherein the second HARQ payload comprises HARQ feedback bundled from the second group of downlink component carriers;

adjusting a second power control value for the second PUCCH associated with the second group of downlink component carriers based at least in part on the determined second HARQ payload size; and transmitting the first PUCCH based at least in part on the first power control value and the second PUCCH based at least in part on the second power control value.

2. The method of claim 1, wherein the first PUCCH and the second PUCCH are configured on a common uplink component carrier.

3. The method of claim 2, wherein a resource for the second PUCCH is determined based at least in part on a resource for the first PUCCH.

4. The method of claim 2, wherein a resource for the first PUCCH is determined based at least in part on information within the first group of downlink component carriers, and a resource for the second PUCCH is determined based at least in part on information within the second group of downlink component carriers.

5. The method of claim 1, wherein the first PUCCH is configured on a first uplink component carrier of the multi-carrier configuration and the second PUCCH is configured on a second uplink component carrier of the multi-carrier configuration.

6. The method of claim 5, wherein the first uplink component carrier is associated with a primary cell group corresponding to a primary cell, and the second uplink component carrier is associated with a secondary cell group corresponding to a secondary cell.

7. The method of claim 6, wherein the primary cell group is associated with a first base station, and the secondary cell group is associated with a second base station, the first base station and the second base station being in communication via a non-ideal backhaul link.

8. The method of claim 1, further comprising:
adjusting a physical uplink shared channel (PUSCH) offset based on the first HARQ payload size for the first group of downlink component carriers, the second HARQ payload size for the second group of downlink component carriers, or a third HARQ payload size of both the first group of downlink component carriers and the second group of downlink component carriers.

9. The method of claim 1, further comprising:
triggering aperiodic channel state information (CSI) reporting based at least in part on a number of downlink component carriers of the first group, a number of downlink component carriers of the second group, or a number of downlink component carriers of both the first and the second groups.

10. The method of claim 1, wherein a component carrier of the first group of downlink component carriers or the second group of downlink component carriers includes a carrier segment.

11. The method of claim 1, wherein the first group of downlink component carriers and the second group of downlink component carriers comprise a time-division duplexing (TDD) carrier, a frequency-division duplexing (FDD) carrier, or a combination of TDD carriers and FDD carriers.

12. The method of claim 1, further comprising:
determining to transmit uplink control information on a physical uplink shared channel (PUSCH) based at least in part on channel state information (CSI) reports scheduled on the first PUCCH and the second PUCCH.

13. An apparatus for wireless communication, comprising:
a processor;
memory in electronic communication with the processor; and
instructions stored in the memory, the instructions being executable by the processor to:
indicate a capability of supporting a dual physical uplink control channel (PUCCH) configuration;
receive a multi-carrier configuration of downlink component carriers comprising a first group of downlink component carriers and a second group of downlink component carriers, wherein the first group of downlink component carriers and the second group of downlink component carriers together total more than five downlink component carriers;
determine, for a first PUCCH, a first hybrid automatic repeat request (HARQ) payload size of a first HARQ payload corresponding to the first group of downlink component carriers, wherein the first HARQ payload comprises HARQ feedback bundled from the first group of downlink component carriers;
adjust a first power control value for the first PUCCH associated with the first group of downlink component carriers based at least in part on the determined first HARQ payload size;
determine, for a second PUCCH, that a second HARQ payload size of a second HARQ payload corresponding to the second group of downlink component carriers exceeds a threshold, wherein the second HARQ payload comprises HARQ feedback bundled from the second group of downlink component carriers;
adjust a second power control value for the second PUCCH associated with the second group of downlink component carriers based at least in part on the determined second HARQ payload size; and
transmit the first PUCCH based at least in part on the first power control value and the second PUCCH based at least in part on the second power control value.

14. The apparatus of claim 13, wherein the first PUCCH and the second PUCCH are configured on a common uplink component carrier.

15. The apparatus of claim 14, wherein a resource for the second PUCCH is determined based at least in part on a resource for the first PUCCH.

16. The apparatus of claim 14, wherein a resource for the first PUCCH is determined based at least in part on information within the first group of downlink component carriers, and a resource for the second PUCCH is determined based at least in part on information within the second group of downlink component carriers.

17. The apparatus of claim 13, wherein the first PUCCH is configured on a first uplink component carrier of the multi-carrier configuration and the second PUCCH is configured on a second uplink component carrier of the multi-carrier configuration.

18. The apparatus of claim 17, wherein the first uplink component carrier is associated with a primary cell group corresponding to a primary cell, and the second uplink component carrier is associated with a secondary cell group corresponding to a secondary cell.

19. The apparatus of claim 18, wherein the primary cell group is associated with a first base station, and the secondary cell group is associated with a second base station, the first base station and the second base station being in communication via a non-ideal backhaul link.

20. The apparatus of claim 13 wherein the instructions are executable by the processor to:
adjust a physical uplink shared channel (PUSCH) offset based on the first HARQ payload size for the first group of downlink component carriers, the second HARQ payload size for the second group of downlink component carriers of the second group, or a third HARQ payload size of both the first group of downlink component carriers and the second group of downlink component carriers.

21. The apparatus of claim 13, wherein the instructions are executable by the processor to:
trigger aperiodic channel state information (CSI) reporting based at least in part on a number of downlink component carriers of the first group, a number of downlink component carriers of the second group, or a number of downlink component carriers of both the first and the second groups.

22. The apparatus of claim 13, wherein a component carrier of the first group of downlink component carriers or the second group of downlink component carriers includes a carrier segment.

23. The apparatus of claim 13, wherein the instructions are executable by the processor to:
determine to transmit uplink control information on a physical uplink shared channel (PUSCH) based at least in part on channel state information (CSI) reports scheduled on the first PUCCH and the second PUCCH.

24. An apparatus for wireless communication, comprising:
means for indicating a capability of supporting a dual physical uplink control channel (PUCCH) configuration;
means for receiving a multi-carrier configuration of downlink component carriers comprising a first group of downlink component carriers and a second group of downlink component carriers, wherein the first group of downlink component carriers and the second group of downlink component carriers together total more than five downlink component carriers;

means for determining, for a first PUCCH, a first hybrid automatic repeat request (HARQ) payload size of a first HARQ payload corresponding to the first group of downlink component carriers, wherein the first HARQ payload comprises HARQ feedback bundled from the first group of downlink component carriers;

means for adjusting a first power control value for the first PUCCH associated with the first group of downlink component carriers based at least in part on the determined first HARQ payload size;

means for determining, for a second PUCCH, that a second HARQ payload size of a second HARQ payload corresponding to the second group of downlink component carriers exceeds a threshold, wherein the second HARQ payload comprises HARQ feedback bundled from the second group of downlink component carriers;

means for adjusting a second power control value for the second PUCCH associated with the second group of downlink component carriers based at least in part on the determined second HARQ payload size; and means for transmitting the first PUCCH based at least in part on the first power control value and the second PUCCH based at least in part on the second power control value.

25. A non-transitory computer-readable medium storing computer-executable code for wireless communication, the code executable by a processor to:

indicate a capability of supporting a dual physical uplink control channel (PUCCH) configuration;

receive a multi-carrier configuration of downlink component carriers comprising a first group of downlink component carriers and a second group of downlink component carriers, wherein the first group of downlink component carriers and the second group of downlink component carriers together total more than five downlink component carriers;

determine, for a first PUCCH, a first hybrid automatic repeat request (HARQ) payload size of a first HARQ payload corresponding to the first group of downlink component carriers, wherein the first HARQ payload comprises HARQ feedback bundled from the first group of downlink component carriers;

adjust a first power control value for the first PUCCH associated with the first group of downlink component carriers based at least in part on the determined first HARQ payload size;

determine, for a second PUCCH, that a second HARQ payload size of a second HARQ payload corresponding to the second group of downlink component carriers exceeds a threshold, wherein the second HARQ payload comprises HARQ feedback bundled from the second group of downlink component carriers;

adjust a second power control value for the second PUCCH associated with the second group of downlink component carriers based at least in part on the determined second HARQ payload size; and transmit the first PUCCH based at least in part on the first power control value and the second PUCCH based at least in part on the second power control value.

26. The method of claim 1, wherein the first group of downlink component carriers comprises at least five downlink component carriers, and wherein the second group of downlink component carriers comprises at least one downlink component carrier.

* * * * *